US009883035B1

(12) United States Patent
Kulkarni et al.

(10) Patent No.: US 9,883,035 B1
(45) Date of Patent: Jan. 30, 2018

(54) METHODS AND SYSTEMS FOR AUTOMATICALLY RECOGNIZING ACTIONS IN A CALL CENTER ENVIRONMENT USING SCREEN CAPTURE TECHNOLOGY

(71) Applicant: Conduent Business Services, LLC, Dallas, TX (US)

(72) Inventors: Rakesh S. Kulkarni, Webster, NY (US); Wencheng Wu, Rochester, NY (US); Jagadeesh Chandra Bose Rantham Prabhakara, Karnataka (IN); Eric Michael Gross, Rochester, NY (US); Jinhui Yao, Pittsford, NY (US); Isaiah Lorenzo Simmons, Jr., Rochester, NY (US); Michael C. Mongeon, Walworth, NY (US); Madhavi Bangalore Shankara Narayana, Bangalore (IN); Jennifer Watts-Perotti, Pittsford, NY (US)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/479,669

(22) Filed: Apr. 5, 2017

Related U.S. Application Data

(60) Provisional application No. 62/453,596, filed on Feb. 2, 2017.

(51) Int. Cl.
*H04M 3/51* (2006.01)
*H04M 3/42* (2006.01)
(Continued)

(52) U.S. Cl.
CPC ....... *H04M 3/5175* (2013.01); *G06F 11/3041* (2013.01); *G06F 11/3438* (2013.01);
(Continued)

(58) Field of Classification Search
CPC ............ H04M 3/5175; H04M 3/5183; H04M 3/42221
See application file for complete search history.

(56) References Cited

U.S. PATENT DOCUMENTS 8,463,606 B2 * 6/2013 Scott ................ H04M 3/42221
379/88.03
2010/0205561 A1 8/2010 Chen et al.
(Continued)

OTHER PUBLICATIONS

Information about Related Patents and Patent Applications, see section 6 of the accompanying Information Disclosure Statement Letter, which concerns Related Patents and Patent Applications.
(Continued)

*Primary Examiner* — Nafiz E Hoque
(74) *Attorney, Agent, or Firm* — Fox Rothschild LLP

(57) ABSTRACT

A system for recognizing processes performed by a call center agent during a session collects from one or more input devices in communication with the electronic device, input data that includes data pertaining to one or more interactions that a call center agent has with one or more programs running on the electronic device that cause one or more graphical user interfaces to be displayed on a desktop of the electronic device during a session. The system analyzes the input data to generate one or more events and a mid-level event log having one or more of the events, and performs action recognition on the mid-level event log to ascertain one or more actions that were performed within the one or more graphical user interfaces by the call center agent during the session.

20 Claims, 26 Drawing Sheets

(51) Int. Cl.

| | |
|---|---|
| ***G06K 9/62*** | (2006.01) |
| ***G06K 9/32*** | (2006.01) |
| ***G06K 9/00*** | (2006.01) |
| ***G06F 11/34*** | (2006.01) |
| ***G06F 11/30*** | (2006.01) |

(52) U.S. Cl.

CPC ..... *G06K 9/00355* (2013.01); *G06K 9/00771* (2013.01); *G06K 9/3233* (2013.01); *G06K 9/6215* (2013.01); *H04M 3/42221* (2013.01); *H04M 3/5183* (2013.01); *G06K 2209/01* (2013.01); *G06K 2209/03* (2013.01); *G06K 2209/27* (2013.01)

(56) References Cited

U.S. PATENT DOCUMENTS

| | | | | |
|---|---|---|---|---|
| 2013/0016115 | A1* | 1/2013 | Minert .................. | G06Q 10/06 709/231 |
| 2014/0095600 | A1 | 4/2014 | Needham | |
| 2014/0222995 | A1 | 8/2014 | Razden et al. | |
| 2015/0378577 | A1* | 12/2015 | Lum ...................... | G06Q 10/10 715/720 |

OTHER PUBLICATIONS

U.S. Appl. No. 15/479,678, filed Apr. 5, 2017, Methods and Systems for Automatically Recognizing Actions in a Call Center Environment Using Screen Capture Technology.

* cited by examiner

| START TIME | STOP TIME | TYPE | DETAILS | WIDGET | WIDGET LABEL | ACTION |
|---|---|---|---|---|---|---|
| 05/24/2016 11:49:36 | 05/24/2016 11:49:41 | APPLICATION | EXPLORER-DEBUG | SCREEN | | CHANGE |
| 05/24/2016 11:49:38 | 05/24/2016 11:49:38 | MOUSE | LBUTTON | BUTTON | NEW | SINGLE CLICK |
| 05/24/2016 11:49:41 | 05/24/2016 11:49:41 | KEYBOARD | "1214" | TextBox | CONTACT ID | DATA ENTRY |

600

| HIGHLEVEL MOUSE EVENT NAME | HEURISTIC RULE USED TO GENERATE THE MOUSE EVENT |
|---|---|
| (L/R) MOUSE CLICK | MOUSE DOWN FOLLOWED IMMEDIATELY BY MOUSE UP WHILE NO MOUSE POSITION CHANGE |
| (L/R) MOUSE DOUBLE CLICK | CONSECUTIVE (L/R) MOUSE CLICKS |
| (L/R) MOUSE SELECT | MOUSE DOWN FOLLOWED BY SEVERAL MOUSE MOVES AND THEN ENDING WITH MOUSE UP |
| MOUSE SCROLL | CONSECUTIVE MOUSE WHEELS |
| | ALL OTHER MOUSE MOVES LOG ARE REMOVED |

602

```
07/18/2016 12:34:06:996,MOUSE LEFT DOWN, ...
07/18/2016 12:34:07:137,MOUSE LEFT UP, ...
```

606

07/18/2016 12:34:06:996,07/18/2016 12:34:07:137, MOUSE LEFT CLICK, ...

604

```
07/19/2016 11:39:23:478,MOUSE LEFT UP,....,(906; 288)
07/19/2016 11:39:23:880,MOUSE MOVE,...
07/19/2016 11:39:23:880,MOUSE MOVE,....
07/19/2016 11:39:23:890,MOUSE MOVE,....
07/19/2016 11:39:23:920,MOUSE MOVE,....
07/19/2016 11:39:23:940,MOUSE MOVE,....
07/19/2016 11:39:23:963,MOUSE MOVE,....
07/19/2016 11:39:23:979,MOUSE LEFT UP,....,(905; 298)
```

608

07/19/2016 11:39:23:478,07/19/2016 11:39:23:979, MOUSE LEFT SELECT,....,(906;288),(905;298)

FIG. 6

| ID | name | ULCorner-X | ULCorner-Y | Width | Height |
|---|---|---|---|---|---|
| 1 | checkbox-off | 82 | 319 | 12 | 11 |
| 2 | checkbox-off | 353 | 118 | 12 | 11 |
| 3 | checkbox-off | 411 | 117 | 12 | 11 |
| 4 | pulldown | 172 | 85 | 18 | 16 |
| 5 | pulldown | 174 | 365 | 18 | 16 |
| 6 | pulldown | 249 | 408 | 18 | 16 |
| 7 | pulldown | 249 | 429 | 18 | 16 |
| 8 | pulldown | 249 | 448 | 18 | 16 |
| 9 | pulldown | 249 | 466 | 18 | 16 |
| 10 | pulldown | 257 | 490 | 18 | 16 |
| 11 | pulldown | 257 | 509 | 18 | 16 |
| 12 | pulldown | 304 | 384 | 18 | 16 |
| 13 | pulldown | 344 | 85 | 18 | 16 |
| 14 | pulldown | 405 | 490 | 18 | 16 |
| 15 | pulldown | 451 | 366 | 18 | 16 |
| 16 | pulldown | 451 | 429 | 18 | 16 |
| 17 | pulldown | 452 | 384 | 18 | 16 |
| 18 | pulldown | 452 | 408 | 18 | 16 |
| 19 | pulldown | 452 | 448 | 18 | 16 |
| 20 | pulldown | 452 | 466 | 18 | 16 |
| 21 | radio-off | 161 | 341 | 17 | 15 |
| 22 | radio-off | 366 | 148 | 17 | 15 |
| 23 | radio-off | 418 | 148 | 17 | 15 |
| 24 | radio-off | 424 | 164 | 17 | 15 |
| 25 | radio-on | 73 | 343 | 13 | 11 |

Screen shot just before keyboard event

Screen shot just after keyboard event

Trip Return date: 07/12/16

Detail Business Justification: Change of scenery.

Information (Recognition)

* Airline Class of Service to be purchased:

Does the trip require air travel?: ⊙ Yes ated Expenses (Total Expenses = 4444.20 USD)

Airline: 0.00

Before image of "Keyboard typing Event"

After image of "Keyboard typing Event

Crop region of before image

| * City: | << Select >> |
|---|---|
| aurant: | Abbeville,Lousiana |
| | Aberdeen Proving Ground,Maryland |
| | Aberdeen,Maryland |
| | Aberdeen,South Dakota |
| | Abilene Naval & Mc Res Ctr,Texas |
| | Abilene,Texas |
| | Abington,Virginia |
| | Acworth,Georgia |
| | Adairsville,Georgia |
| | Adak,Alaska |
| | Adams County,Colorado |
| | Addison,Texas |
| | Adel,Georgia |
| | Adelphi Naval Reserve Ctr,Maryland |
| | Aiken,South Carolina |
| | Akron,Ohio |
| | Akron/Canton/Ohio |
| | Alameda Cg Isc/nas,California |
| | Alamosa,Colorado |
| | Albany,Georgia |
| | Albany,New York |
| | Albemarle County,Virginia |
| | Albuquerque,New Mexico |
| | Alcoa,Tennessee |
| | Alexandria Naval Reserve Fac,Louisiana |
| | Alexandria,Minnesota |
| | Alexandria,Virginia |
| | Allentown Bethlehem,Pennsylvania |
| | Allentown,Pennsylvania |
| | Alpena Crtc,Michigan |
| | Alpharetta,Georgia |
| tals | |

Crop region of after image

| City: | Kaktovik,Alaska |
|---|---|
| aurant: | Jackson Naval Reserve Ctr, Mississippi |
| | Jackson, Michigan |
| | Jackson, Mississippi |
| | Jackson, Wyoming |
| | Jacksonville Beach,Florida |
| | Jacksonville,Florida |
| | James City,Virginia |
| | Jamesburg,New Jersey |
| | Jamestown Naval Reserve Ctr,New York |
| | Jamestown,New York |
| | Jamestown,North Dakota |
| | Jamestown,Rhode Island |
| | Jefferson City,Missouri |
| | Jefferson County,Alabama |
| | Jefferson County,Colorado |
| | Jefferson County,Missouri |
| | Jefferson Parish,Louisiana |
| | Jeffersontown,Kentucky |
| | Jekyll Island,Georgia |
| | Jenks,Oklahoma |
| | Jersey City,New Jersey |
| | Jersey County,Illinois |
| | Jim Creek Naval Radio Station,Washington |
| | Joe Foss Field Ags,South Dakota |
| | Johnson County,Kansas |
| | Joliet,Illinois |
| | Jonesboro,Arkansas |
| | Jonesboro,Georgia |
| | Joplin Naval Reserve Ctr,Missouri |
| | Joplin,Missouri |
| | Juneau,Alaska |
| tals | |

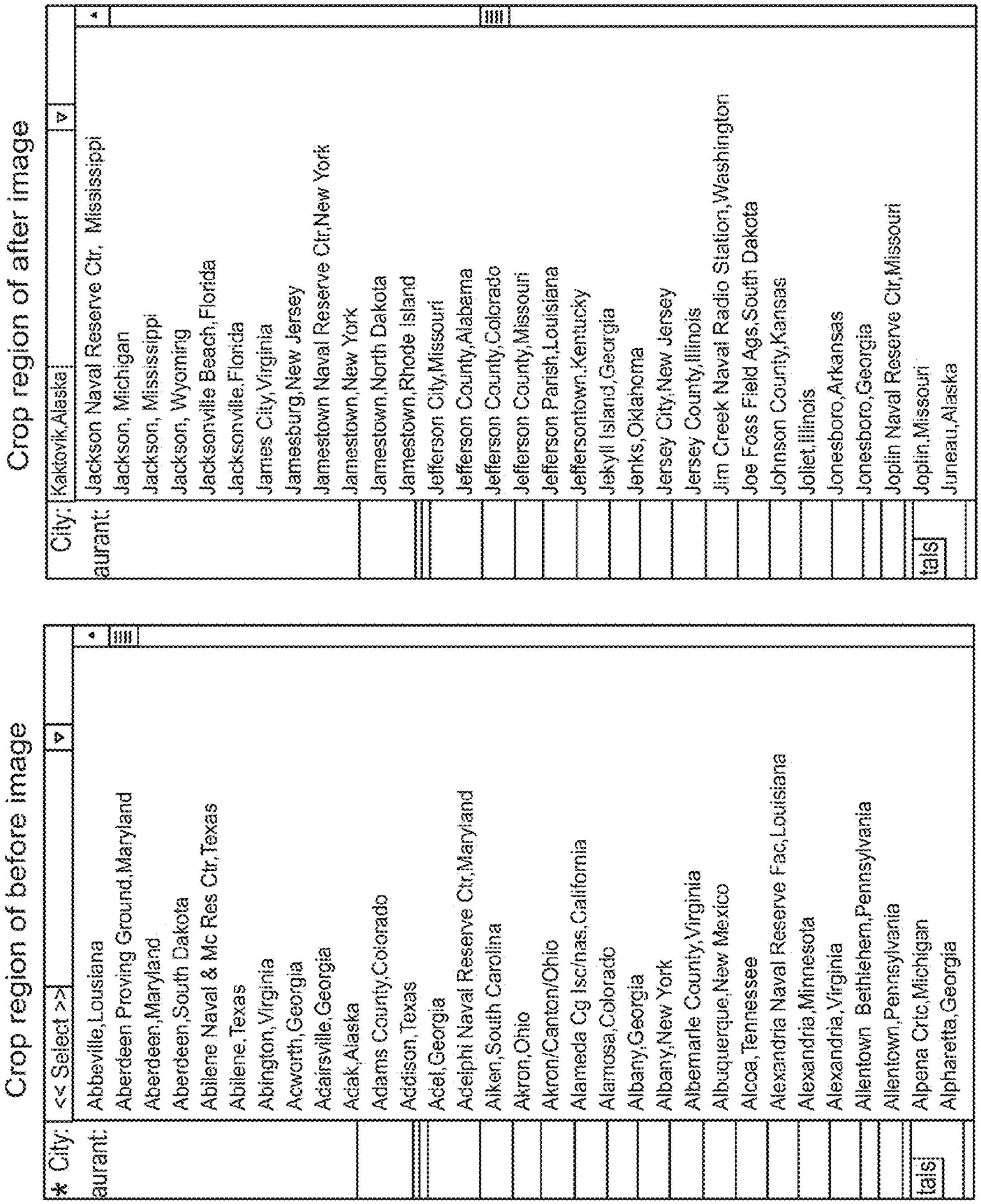

FIG. 16 after image of "L Mouse Click Event after image of "L Mouse Click Event

Crop region of before image

Crop region of after image

2260369 ONTARIO INC. EAST SIDE MARIO'S
7-11
Bigbell
Burger king
crazypianos
Fornaio Sainte Claire
HMShost Schiphol airport
Hyatt Regency SFO Hotel, Swiftwater
Mezze
Peking house resturant
sheetz #288
super-market
Cafeteria

| Event ID | Start time | End time | Type | Program | Window name | Action ID | Widget ID | Detail |
|---|---|---|---|---|---|---|---|---|
| 1 | 07/25/2016 09:15:57 | 07/25/2016 09:16:00 | APPLICATION | pythonw.exe | *Python 2.7.11 Shell* | Change | Screen | pythonw.exe |
| 1 | 07/25/2016 09:16:00 | 07/25/2016 09:16:00 | MOUSE | pythonw.exe | *Python 2.7.11 Shell* | Change | Screen | LButton "click to switch to new app" |
| 2 | 07/25/2016 09:16:01 | 07/25/2016 09:18:10 | APPLICATION | | WENCHENG WU | Change | Screen | jp2launcher.exe |
| 2 | 07/25/2016 09:16:03 | 07/25/2016 09:16:03 | MOUSE | jp2launcher.exe | WENCHENG WU | Click | Button | LButton "Click on Button <Create a new expense report> to close an window" |
| 2 | 07/25/2016 09:16:10 | 07/25/2016 09:16:10 | MOUSE | jp2launcher.exe | New Forms List | Click | Button | LButton "Click on Button <Note This form may be used for company approved expenses only.> to close an window" |
| 2 | 07/25/2016 09:16:17 | 07/25/2016 09:16:27 | KEYBOARD | jp2launcher.exe | Report Information | DataEntry | Field | "wen's taiwan trip #7" keyboard unknown [need work]" |
| 2 | 07/25/2016 09:16:30 | 07/25/2016 09:16:30 | MOUSE | jp2launcher.exe | Report Information | Click | PullDown | LButton "In: click on pull-down menu" |
| 2 | 07/25/2016 09:16:33 | 07/25/2016 09:16:33 | MOUSE | jp2launcher.exe | Report Information | Select | PullDown | LButton "Out: select item <> in pull-down" |
| 2 | 07/25/2016 09:16:42 | 07/25/2016 09:16:42 | MOUSE | jp2launcher.exe | Report Information | Click | RadioButton | LButton "Out: button click or enable pull-down or select item [need work]" |
| 2 | 07/25/2016 09:16:59 | 07/25/2016 09:16:59 | MOUSE | jp2launcher.exe | WENCHENG WU [Expense Report: wen's taiwan trip #7] | Click | PullDown | LButton "In: click on pull-down menu" |
| 2 | 07/25/2016 09:17:12 | 07/25/2016 09:17:12 | MOUSE | jp2launcher.exe | WENCHENG WU [Expense Report: wen's taiwan trip #7] | Select | PullDown | LButton "In: select item in pull-down" |
| 2 | 07/25/2016 09:17:54 | 07/25/2016 09:17:54 | MOUSE | jp2launcher.exe | Form Saved | Click | Button | LButton "Click on Button <Note This form is in draft status> to close an window" |
| 2 | 07/25/2016 09:17:56 | 07/25/2016 09:17:56 | MOUSE | jp2launcher.exe | WENCHENG WU [Expense Report: wen's taiwan trip #7] | Click | Button | LButton "Click on Button <Close> to close an window" |
| 2 | 07/25/2016 09:18:03 | 07/25/2016 09:18:03 | MOUSE | jp2launcher.exe | Confirm Delete | Click | Button | LButton "Click on Button <Yes> to close an window" |
| 2 | 07/25/2016 09:18:05 | 07/25/2016 09:18:06 | MOUSE | jp2launcher.exe | - WENCHENG WU | Click | Button | LButton "Click on Button <Sign Out> to close an window" |
| 2 | 07/25/2016 09:18:10 | 07/25/2016 09:18:10 | MOUSE | jp2launcher.exe | Confirm Sign Out | Click | Button | LButton "click to close current app" |
| 3 | 07/25/2016 09:18:14 | 07/25/2016 09:18:16 | APPLICATION | pythonw.exe | *Python 2.7.11 Shell* | Change | Screen | pythonw.exe |
| 3 | 07/25/2016 09:18:16 | 07/25/2016 09:18:16 | MOUSE | pythonw.exe | *Python 2.7.11 Shell* | Change | Screen | LButton "click to switch to new app" |
| 4 | 07/25/2016 09:18:17 | 07/25/2016 09:18:20 | APPLICATION | iexplore.exe | E-Pay - Internet Explorer | Change | Screen | iexplore.exe |
| 4 | 07/25/2016 09:18:17 | 07/25/2016 09:18:17 | MOUSE | iexplore.exe | E-Pay - Internet Explorer | Click | Button | LButton "Click on Button <-=> to close an window" |
| 4 | 07/25/2016 09:18:20 | 07/25/2016 09:18:20 | MOUSE | iexplore.exe | Internet Explorer | Click | Button | LButton "click on <all> to close current app" |
| 5 | 07/25/2016 09:18:20 | 07/25/2016 09:18:21 | APPLICATION | pythonw.exe | *Python 2.7.11 Shell* | Change | Screen | pythonw.exe |

FIG. 25

METHODS AND SYSTEMS FOR AUTOMATICALLY RECOGNIZING ACTIONS IN A CALL CENTER ENVIRONMENT USING SCREEN CAPTURE TECHNOLOGY

CROSS-REFERENCE TO RELATED APPLICATIONS

This application claims the benefit of U.S. Provisional Patent Application No. 62/453,596 filed Feb. 2, 2017, the content of which is herein incorporated by reference in its entirety.

BACKGROUND

In a call center environment, it is important to understand interactions that call center agents have with programs and applications that are used to handle caller inquiries such as, for example, what application or programs a call center agent uses, or more specifically, a sequences of application and program interactions, and a sequence of data field interactions that a call center agent performs during order processing, customer support, technical support, trouble-shooting and/or the like. In call center environments, action discovery is typically accomplished by consultants who work alongside call center agents to understand the steps of the processes being performed, or who manually review recorded call center agent sessions offline. This requires a large time investment from the consultants, increases the time required to complete a process improvement initiative, and is a hindrance to existing process deliveries. In addition, details of the process can be missed utilizing this approach.

The methods and systems described in this disclosure overcome many of the deficiencies of known process recognition approaches by implementing an automatic computer-implemented process recognition process that operates seamlessly with call center communications systems technology behind the scenes while a call center agent is performing his or her duties. This approach provides an accurate, efficient and cost effective way to automatically recognize processes and actions being performed by a call center agent during sessions without the need for human physical observation. Once these processes and actions are understood, they can be leveraged to identify process inefficiencies and bottlenecks.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms “a,” “an,” and “the” include plural references unless the context clearly dictates otherwise. Unless defined otherwise, all technical and scientific terms used in this document have the same meanings as commonly understood by one of ordinary skill in the art. As used in this document, the term “comprising” means “including, but not limited to.”

In an embodiment, a system for recognizing processes performed by a call center agent during a session may include an electronic device, and a computer-readable storage medium. The computer-readable storage medium includes one or more programming instructions that, when executed, cause the electronic device to perform or not perform one or more actions. The system collects from one or more input devices in communication with the electronic device, input data that includes data pertaining to one or more interactions that a call center agent has with one or more programs running on the electronic device that cause one or more graphical user interfaces to be displayed on a desktop of the electronic device during a session. The system analyzes the input data to generate one or more events, where each event includes a consolidation of at least a portion of the input data. The system generates a mid-level event log having one or more of the events, and performs action recognition on the mid-level event log to ascertain one or more actions that were performed within the one or more graphical user interfaces by the call center agent during the session. The system performs action recognition on the mid-level event log by, for one or more events in the mid-level event log, identifying a before-event image for the event, identifying an after-event image for the event, performing image analysis on the before-event image and the after-event to generate a delta image showing a region of interest that includes one or more changes between the before-event image and the after-event image, and automatically classifying the event as an action based on the delta image. The before-event image is a screen shot of the desktop that was automatically captured by the electronic device in real-time before the event occurred and in anticipation of the event, and the after-event image is a screen shot of the desktop of the electronic device that was automatically captured by the electronic device in real-time after the event occurred. The system generates an event log that comprises an indication of the event and corresponding action.

Optionally, the system may collect input data by initiating a keyboard logging thread to collect one or more keystrokes that are entered via a keyboard in communication with the electronic device during the session. The system may initiate a mouse logging thread to collect data associated with movement or operation of the mouse during the session. The system may initiate an active window logging thread to collect data associated with active windows during the session.

The system may apply one or more heuristic rules to the input data to generate the mid-level event log. For example, the system may identify consecutive keyboard entries in the input data, and in response to determining that a time between each keyboard entry is less than a threshold value, merge the keyboard entries into a single typing event. As another example, the system may identify from the input data representing a mousedown event corresponding to a mouse followed by data representing a mouseup event corresponding to the mouse such that there is no change in a position of the mouse, and consolidate the mousedown event and the mouse up event into a single event represented as a mouse click event. In another example, the system may identify from the input data consecutive mouse clicks corresponding to a mouse, and consolidate the consecutive mouse clicks into a single event represented as a double click mouse click event. The system may identify from the input data a mousedown event followed by a plurality of mouse movement events followed by a mouseup event, and consolidate the mousedown event, the mouse movement events and the mouseup event into a single event represented as a mouse select event. As another example, the system may identify from the input data consecutive mouse wheel events, and consolidate the consecutive mouse wheel events into a single event represented as a mouse scroll event.

The system may perform image analysis to generate a delta image by identifying a screen to which the before-event image and the after-event image correspond by comparing the before-event image and the after-event image to one or more screens in a unique screen library. The unique screen library stores each unique screen that the call agent may encounter during a session along with metadata associated with each unique screen. The system may analyze the screen to identify a region on the screen that corresponds to the region of interest, and analyze the metadata associated with the screen to identify a data field located within the region. Classifying the event as an action based on the delta image may involve classifying the event based on the data field. As an example, the event may be a mouse click, and the system may analyze the metadata to identify a dropdown menu and classify the event as a select dropdown menu action. The system may perform optical character recognition on the dropdown menu.

Classifying the event as an action based on the delta image may involve performing optical character recognition on the region of interest. The system may apply a process discovery technique to the event log to generate a process map showing the actions performed by the call center agent during the session.

BRIEF DESCRIPTION OF THE DRAWINGS

FIG. 6 illustrates example input data that includes raw mouse logs, corresponding mid-level event logs and a heuristic rule set according to various embodiments.

FIG. 16 illustrates an example changed region according to an embodiment.

FIG. 25 illustrates an example event log according to an embodiment.

DETAILED DESCRIPTION

Figure 1A:
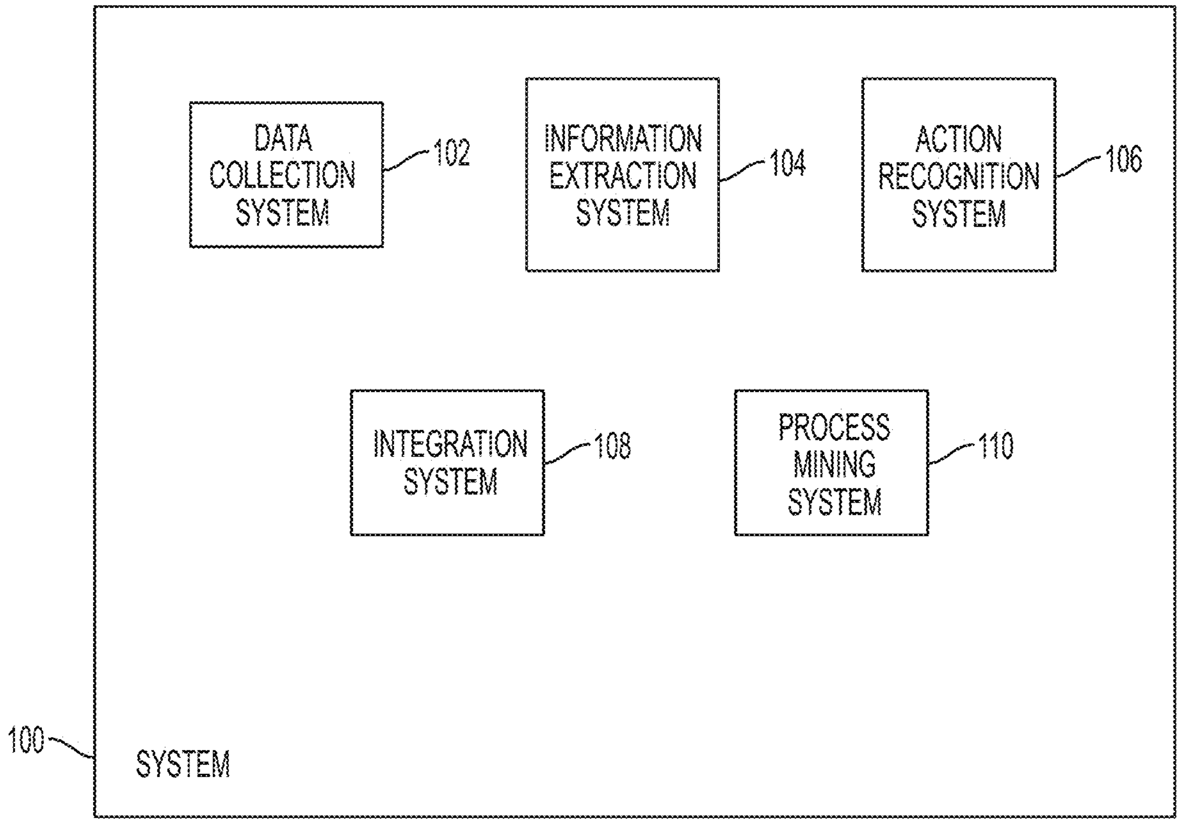
FIG. 1A illustrates an example system for automatically detecting processes according to an embodiment.

The following terms shall have, for purposes of this application, the respective meanings set forth below:

An "after-event image" refers to a screen shot of a desktop of a user electronic device captured after the occurrence of an event.

A "before-event image" refers to a screen shot of a desktop of a user electronic device captured before the occurrence of an event.

A "call center" is an organization, location or group of locations that operates to initiate and/or receive inquiries from customers via phone, interactive messaging applications such as chat applications, or other interactive electronic media. A call center may process orders, provide customer service, provide technical support, answer inquiries initiated by telephone, email, fax, or from other input sources and/or the like. A call center utilizes various hardware, software and network components. For example, a call center may include electronic devices, such as desktop or laptop computers, that call agents may use to handle calls. Call center agents may also use headsets to hear call audio. Electronic devices in a call center may communicate with one another or other electronic devices using one or more communication networks. A communication network may be a local area network (LAN), a wide area network (WAN), a mobile or cellular communication network, an extranet, an intranet, the Internet and/or the like. Electronic devices in a call center may run or operate various programs or applications to help call center agents perform their jobs. Examples of such programs or applications include, without limitation, customer relationship management systems, enterprise resource planning systems, workforce management systems, call queuing systems, call recording systems, and/or the like. Call centers may include physical telephones via which call center agents place and receive calls. Additionally and/or alternatively, call centers may utilize voice over Internet protocol (VoIP) to place and receive calls. Examples include telemarketing centers, customer technical or product support groups, and centers for receiving customer orders via phone.

A "call center agent" is a person who is employed to initiate and/or receive communications, such as phone calls, web chats, or other live communications, from the call center's customers. A "call" refers to any such communication between a customer and a call center agent.

A "delta image" refers to an image showing one or more differences between a before-event image for an event and an after-event image for the event.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

A "widget" or "data field" refers to an element of a graphical user interface that displays information or provides a mechanism by which a user, such as a call agent, can interact with a program or application. Example data fields may include, without limitation, data entry fields, dropdown or pulldown menus, radial buttons and/or the like.

A "window" or "screen" refers to a portion of a graphical user interface associated with an application, program or the like.

The present disclosure describes various systems and methods for automatically discovering processes in an environment, such as a call center. A process refers to a set of computer-implemented steps or actions performed by a user to accomplish a particular result. For instance, in a call center environment, a call agent may utilize various computer programs or applications to handle, address or resolve customer inquiries. The call agent may gather information pertaining to the inquiry from the caller, and may provide certain information to the computer programs or applications via one or more windows. A process may refer to the steps or actions performed in the agent's interaction with the computer programs or applications.

A window may include one or more static elements and or dynamic elements. A static element refers to data that is not changeable by a user of the window. Example static elements may include text such as field labels, instructions, notes and/or the like. A dynamic element refers to data whose value or content is changeable by a user of the window. Example dynamic elements may be widgets such as, for example, text fields, drop down menus, radio buttons and/or the like.

FIG. 1A illustrates an example system for automatically detecting processes according to an embodiment. As illustrated by FIG. 1A, the system 100 includes a data collection system 102, an information extraction system 104, an action recognition system 106, an integration system 108, and a process mining system 110.

The data collection system 102 collects input data from a user electronic device. A user electronic device refers to an electronic device associated with a user who is performing at least a portion of one or more processes that is being discovered. For instance, a user electronic device may refer to a desktop or laptop computer used by a call center agent who provides customer or technical support. Additional and/or alternate electronic devices may be used within the scope of this disclosure.

A data collection system 102 may include interfaces to one or more input devices of a user electronic device. For instance, a data collection system 102 may interface with and collect input data from a keyboard, mouse, a video camera, a touch-sensitive screen or other input device of a user electronic device. Input data may include, without limitation, keyboard input, mouse input such as mouse click data and coordinate or positional information associated with the mouse, application data such as names associated with active windows, screen shots, and/or the like. As described in more detail below, a data collection system 102 can utilize smart capture capability so that it captures only relevant data of interest.

A data collection system includes memory for storing input data or other information provided to the data collection system. The data collection system may also include an internal clock for providing time and date stamps for the collected information.

In certain embodiments, a data collection system 102 may reside on a user electronic device. Alternatively, a data collection system 102 may be distributed, but communicate with the user electronic device via one or more networks such as a local area network or a wide area network, for example the Internet, the World Wide Web or the like.

An information extraction system 104 analyzes at least a portion of the input data collected by the data collection system 102 to generate one or more mid-level event logs. The information extraction system 104 uses various techniques, such as image and data analytics as described below, to infer from input data actions performed in one or more processes and identify events at different levels of granularity. For instance, as described in more detail below, an information extraction system 104 may transform separate input data or logs of input data into one or more mid-level event logs.

Figure 1B:
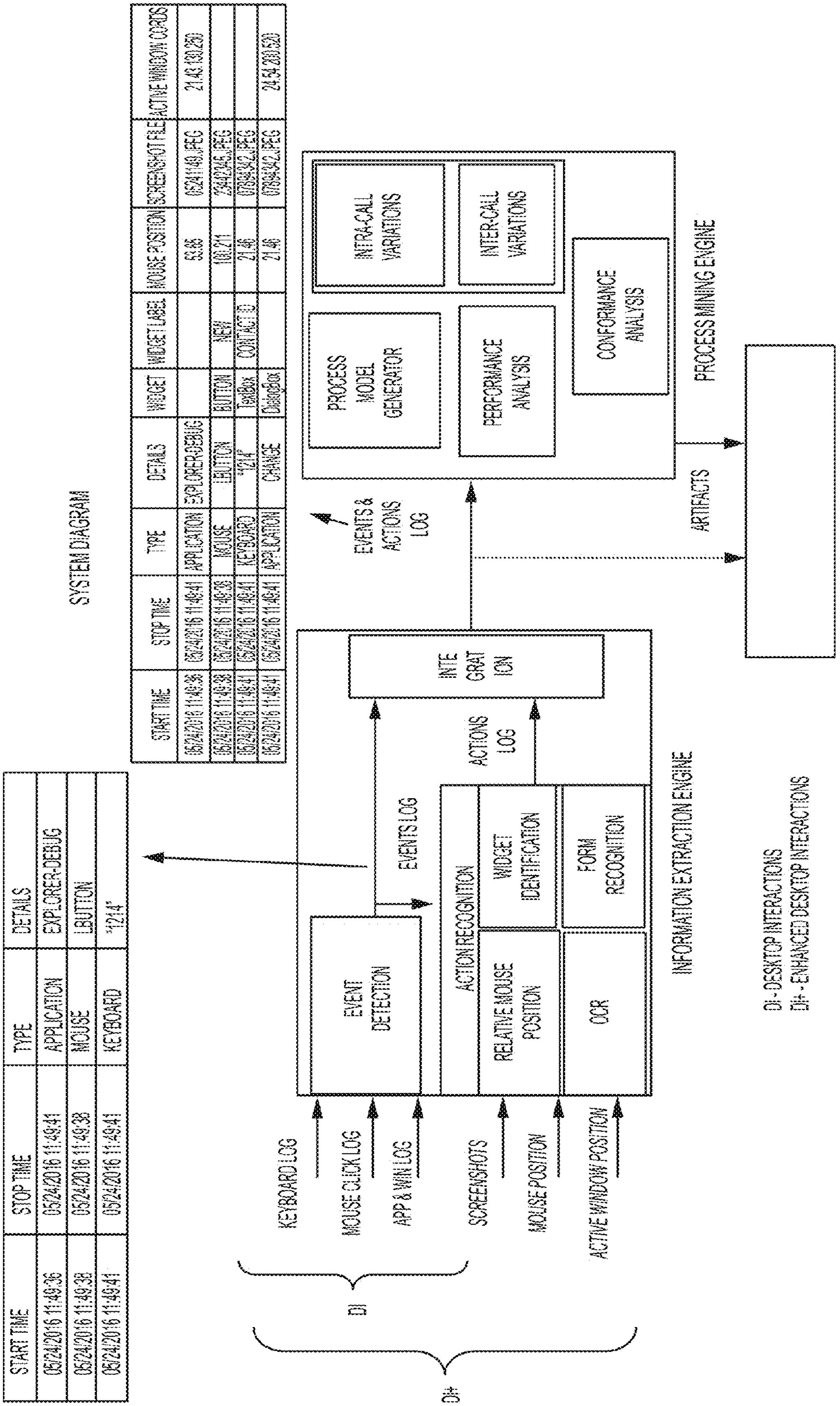
FIG. 1B illustrates a high level system diagram according to various embodiments.

An action recognition system 106 utilizes mid-level event logs in conjunction with image analysis to facilitate action recognition as described in more detail below. The integration system 108 refines log information using one or more heuristic rules as described in more detail below. Although FIG. 1A illustrates the action recognition system 106 and integration system 108 as separate from the information extraction system 104, it is understood that the action recognition system and/or the integration system may be implemented as a subsystem to an information extraction system, as illustrated by FIG. 1B. FIG. 1B illustrates a high level system diagram according to various embodiments.

A processing mining system 110 analyzes the logs generated by the information extraction system 104 to develop one or more process maps or other information pertaining to one or more processes.

Figure 2:
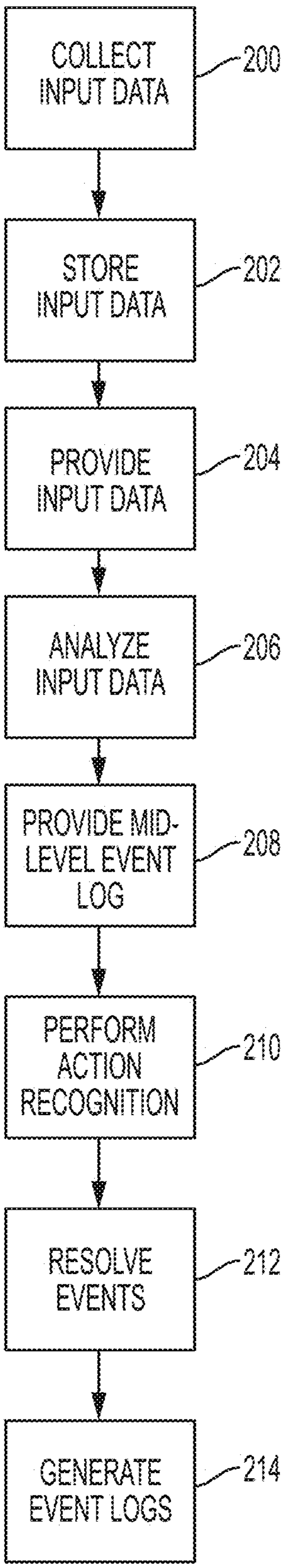
FIG. 2 illustrates an example method of automatically detecting processes according to an embodiment.

FIG. 2 illustrates an example method of automatically recognizing processes according to an embodiment. As illustrated by FIG. 2, the system may collect 200 input data from a user electronic device. Input data may be data that pertains to one or more interactions that a call center agent has with a user electronic device during a session. As discussed above, a data collection system may collect 200 input data from a user electronic device. The data collection system monitors user-induced system activity and collects data pertaining to such activity.

A user electronic device may contain and operate many different programs and applications that are provided by many different providers. A data collection system may not have direct access to such programs or applications, whether through APIs or otherwise. As such, a data collection system collects input data by direct communication with the operating system of a user electronic device.

A data collection system may collect input data via one or more threads. A thread refers to a sequence of programming instructions that cause an electronic device to perform one or more actions. To begin collecting input data, a data collection system may initiate one or more threads. One such thread may be a keyboard logging thread. A keyboard logging thread collects input data received by a user electronic device from a keyboard and an associated time stamp for such input data. The input data may include keystrokes and multi-keystroke combinations such as, for example, Ctrl-c, Ctrl-alt-s and/or the like.

Another thread may be a mouse logging thread. A mouse logging thread collects input data received by a user electronic device from a mouse and an associated time stamp for such input data. The input data may include mouse position coordinates, mouse actions such as left-click, right-click, and scroll. The input data may include a name of a window over which a mouse hovers or is otherwise positioned. This may or may not be an active window.

Another thread may be an active window logging thread. An active window logging thread collects information about an active window at a particular point in time. An active window refers to a currently focused window of a user electronic device. Information about an active window may include an indication of when an active window is changed, a timestamp associated with a change, one or more coordinates of an active window, active window changes in coordinates, active window title, and one or more timestamps associated with any of the foregoing.

Another thread may be a screen capture thread. A screen capture thread captures and collects screen shots of a display of a user electronic device at a particular point in time. The screen shot includes an image of the user electronic device desktop at a certain time.

To reduce demands on memory requirements, a screen capture thread may only capture those screen shots of interest to assist in identifying activities and usage behavior. However, it is beneficial to the process to understand an agent's activities before and after an event of interest. For example, an event of interest may be an agent-initiated change of an active window. To better understand the agent's actions, it would be helpful to have a screen shot of the active window prior to the change and a screen shot of the active window immediately after the change. While it may be possible to capture this relevant time period using video or by recording numerous screen shots at a high sample rate, these approaches are memory intensive. Instead a screen capture thread may perform a smart capture process. A smart capture process anticipates an event of interest and in response, begins to collect screen shots in real-time at a high sampling rate. The screen capture thread stops sampling after the event has occurred.

For instance, using the above example, a screen capture thread may anticipate that an agent is about to change the active window on a user electronic device. In response, the screen capture thread may collect screen shots in real-time at a high sampling rate after the active window has changed. As such, the screen capture thread captures screen shots of the previous active window and the new active window.

Figure 3:
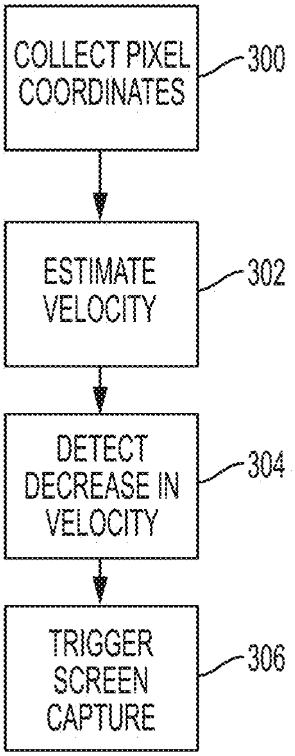
FIG. 3 illustrates an example method of a smart capture process according to an embodiment.

FIG. 3 illustrates an example method of a smart capture process according to an embodiment. As illustrated by FIG. 3, a data collection system may collect 300 the (x,y) pixel coordinates of the mouse over a period of time. The data collection system may use the coordinates to estimate 302 the mouse velocity. In response to detecting 304 a decrease in the velocity and a velocity value that is less than a threshold value, the data collection system may trigger 306 a screen capture. A screen capture may capture one or more screen shots of the desktop of a user electronic device. A screen shot may capture one screen shot, or it may capture several screen shots such as a burst of screen shots over a short period of time.

In an embodiment, this process may be performed each time the mouse velocity falls below a threshold value. Alternatively or additionally, this process may be performed at a certain time after the system detects a mouse click event. A mouse click event may be indicative that an action of interest such as, for example, the opening of a window, the closing of a window, depressing or toggling a switch, the typing of information, switching a window, or switching a tab, is about to occur. As such, the system may attempt to capture screen shots around that event.

In certain embodiments, to avoid responding to multiple quick succession crossings of the threshold value due to noise or irrelevant movement of the mouse, the data collection system may utilize a second threshold value that is greater than the first threshold value. The second threshold value may need to be exceeded before the data collection system permits another screen capture. The threshold values discussed above may be determined heuristically or experimentally. The threshold values may be scaled from one call center agent's desktop to another based on a screen resolution setting (e.g., using different thresholds for 1600×900 vs. 800×600 screen settings). The threshold values may be set to low for a given call center agent at the beginning (more screen capture) while changing the values over time as the system learns more about the habit of the call center agent by analyzing the screen captures.

Figure 23:
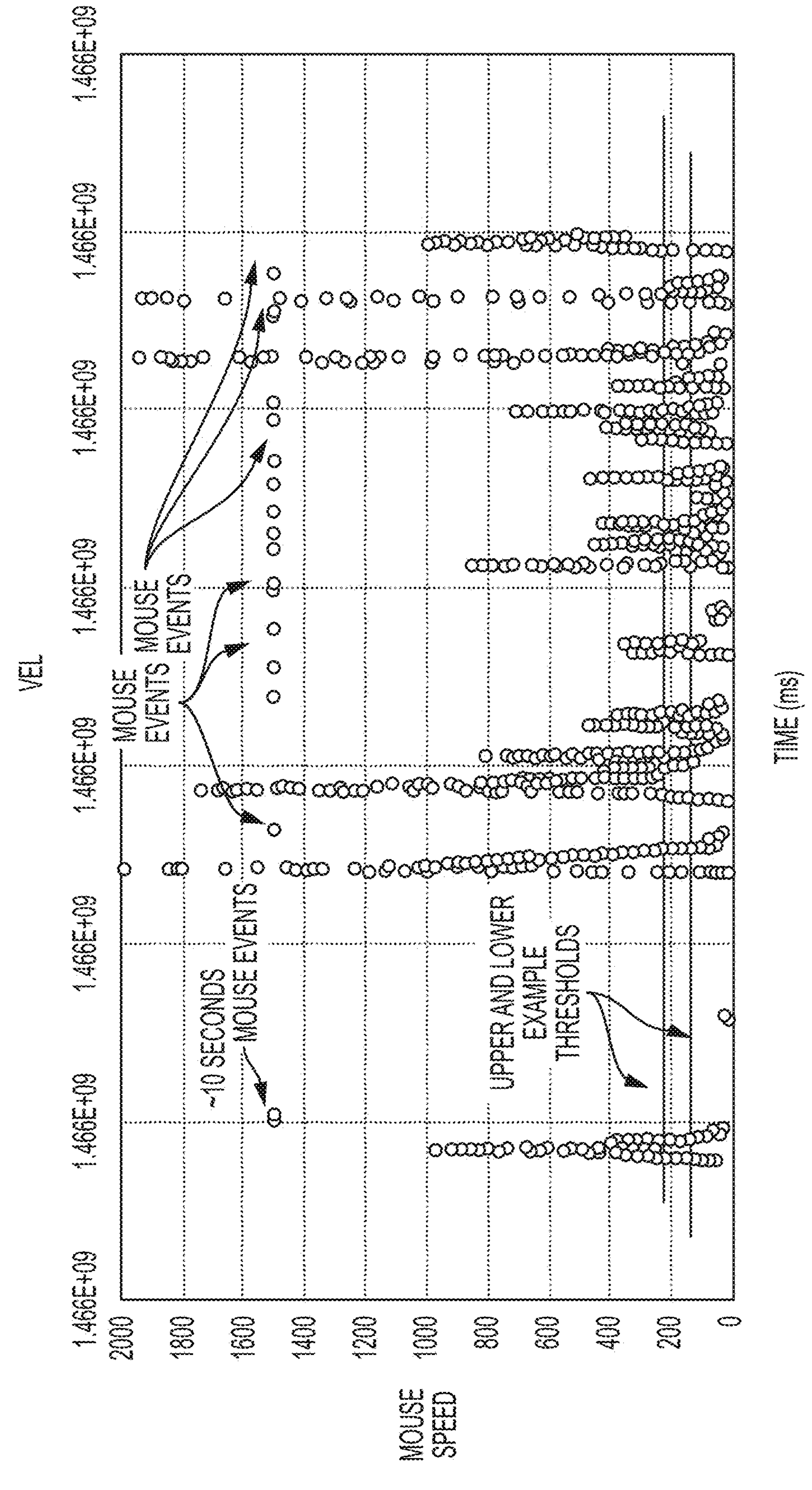
FIG. 23 illustrates a chart of example mouse velocities and thresholds according to an embodiment.

For instance, a first threshold value may be 180 pixels per second, and a second threshold value may be 215 pixels per second. When the mouse velocity is less than 180 pixels per seconds, the data collection system may trigger a screen capture. However, the data collection system may not trigger another screen capture until the mouse velocity increases above 215 pixels per seconds and then once again falls below 180 pixels per second. This way, if the velocity increases to a level less than 215 pixels and then falls below 180 pixels due to noise, the data collection system does not perform unnecessary screen captures. FIG. 23 illustrates a chart of example mouse velocities and thresholds according to an embodiment.

A screen capture thread may sample screen capture images at a certain period of time or at certain intervals. For example, a screen capture thread may sample screen capture images every half second. Additional and/or alternate time periods may be used within the scope of this disclosure. The system may compare one or more screen capture images to one or more preceding screen capture images that were captured. For instance, the system may compare a screen capture image to a screen capture image that was captured immediately before it. The system may determine whether the screen capture images are substantially similar. For instance, the system may compare the layout and/or content of the screen capture images to determine whether they are substantially different. Screen capture images may be substantially different if a number of pixels that have changed between the two exceeds a threshold value. In response to determining that the screen capture images are not substantially different, the system may delete one of the screen capture images from memory. This reduces the amount of memory used. In response to determining that the screen capture images are substantially different, the system may keep both screen capture images.

The smart capture process described by FIG. 3 allows the system to collect and store targeted screen shots, which reduces the processing capacity needed to analyze such screen shots as well as the memory needed to store such screen shots.

Figures 4A, 4B:
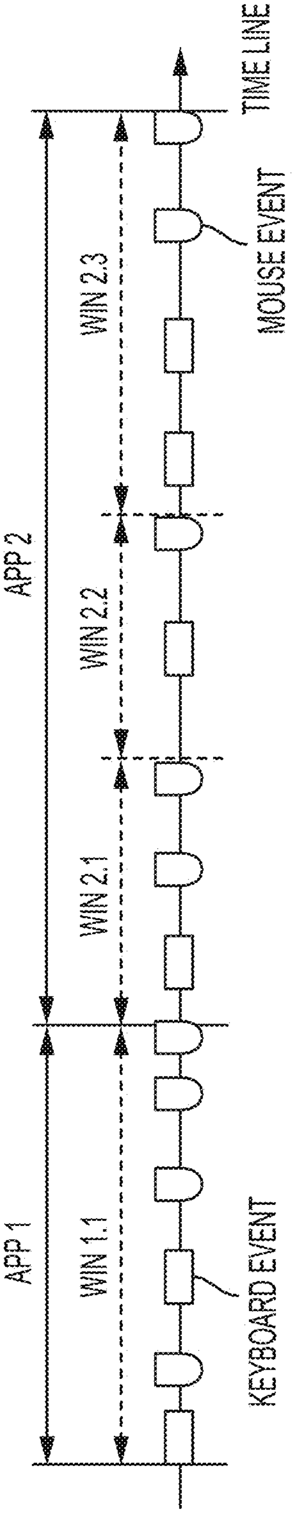
FIG. 4A illustrates an example input data log according to an embodiment.
FIG. 4B illustrates an example visual representation of logged data according to an embodiment.

Referring back to FIG. 2, a data collection system stores 202 the input data collected by one or more of the threads. The data collection system stores 202 the input data in a database, table or other data structure in memory. Each item of input data may be stored as a separate entry in memory. The items may be ordered sequentially based on their corresponding time stamp. FIG. 4A illustrates an example input data log according to an embodiment. FIG. 4B illustrates an example visual representation of logged data according to an embodiment.

Referring back to FIG. 2, a data collection system provides 204 at least a portion of the stored input data to an information extraction system. A data collection system may send at least a portion of the stored input data to an information extraction system, or it may make such input data accessible to the information extraction system.

An information extraction system analyzes 206 the input data to generate one or more mid-level event logs. Mid-level event logs may include a portion of input data that has been merged, consolidated or otherwise transformed, which may be represented as an event. A mid-level event log includes an indication of one or more events, where each event represents an indication of one or more interactions that a call center agent had with a desktop during a session. An information extraction system analyzes 206 input data by analyzing temporal proximity of items of input data. An information extraction system analyzes 206 input data by applying one or more heuristic rules to the input data.

Figure 5:
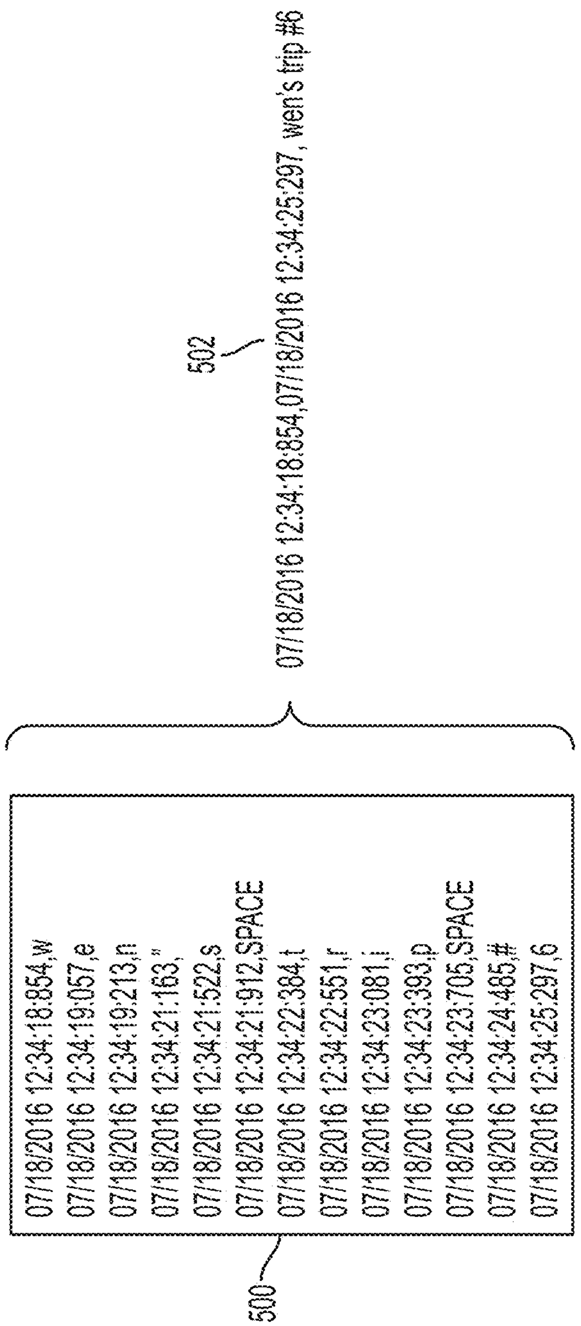
FIG. 5 illustrates example input data according to an embodiment.

For instance, input data representing consecutive keyboard entries may be merged into a single typing event if the time between each consecutive keyboard entry is less than 1 second. For example, FIG. 5 illustrates example input data according to an embodiment. As illustrated by FIG. 5, the input data 500 includes multiple individual time-stamped entries indicating that certain characters were entered. Each entry includes an indication of the date that the entry was received by a user electronic device, a time that the entry was received by the user electronic device, and an indication of the character that was received. For instance, the first entry indicates that the character 'w' was received at 12:34:18:854 on Jul. 18, 2016.

A heuristic rule may specify that consecutive keyboard entries are to be merged into a single mid-level event log if the time between each consecutive keyboard entry is less than 1 second. Applying this heuristic rule to the input data illustrated by FIG. 5 yields the mid-level event log 502 illustrated by FIG. 5. As the time stamp for each input data entry is within one second from the previous entry, the characters represented by the input data are merged into a single event log. As shown by FIG. 5, the mid-level event log includes an indication of a start time, end time, and content. The start time represents the date and/or time that the first data entry of the mid-level event log is received, and the end time represents the data and/or time that the last data entry of the mid-level event log is received.

An information extraction system may maintain and store a set of heuristic rules that it may apply to input data. The set of heuristic rules may be stored in memory in, for example, a database, a list, a table and/or the like. In certain embodiments, one or more heuristic rules may be specified by a system user, operator, administrator and/or the like.

FIG. 6 illustrates example input data that includes raw mouse logs, corresponding mid-level event logs and a heuristic rule set according to various embodiments. Applying the heuristic rules 600 illustrated in FIG. 6 to the input data 602, 604 illustrated in FIG. 6 yields the mid-level event logs 606, 608 illustrated in FIG. 6. As illustrated by FIG. 6, applying the heuristic rules to the input data transforms the raw mouse data (e.g., mouse down (left, middle, right), mouse up (left, middle, right), and mouse move) to discrete events (e.g., mouse click (left or right), mouse double click (left or right), mouse scroll (left or right), and mouse select). The information extraction system may remove data from the input data that does not correlate to one or more heuristic rules as this data is likely non-meaningful to process identification.

Figure 7:
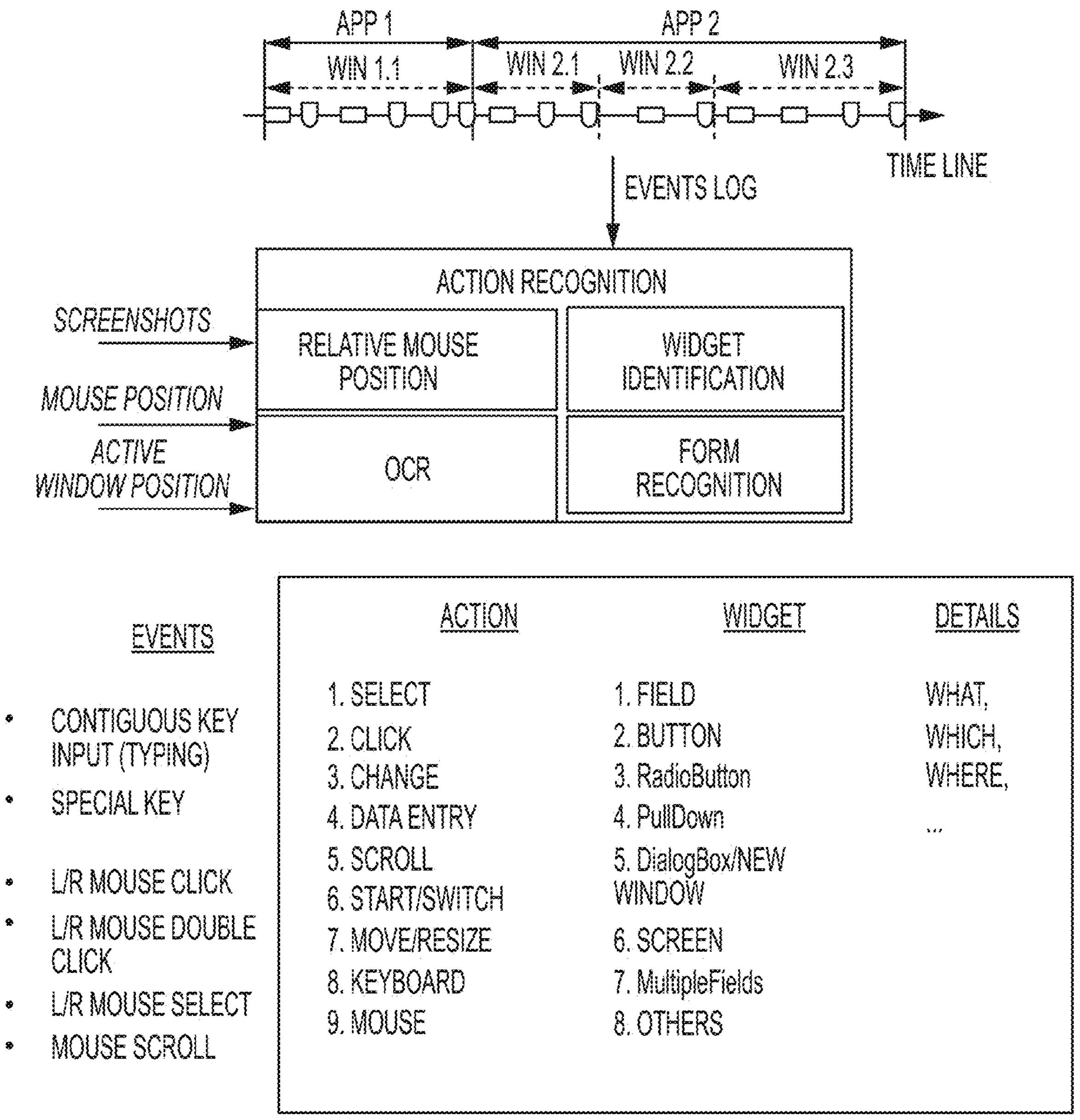
FIG. 7 illustrates an example visual depiction of an action recognition process according to an embodiment.
Figure 8:
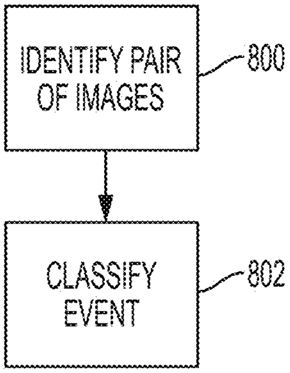
FIG. 8 illustrates an example method of performing action recognition according to an embodiment.

Referring back to FIG. 2, the information extraction system may provide 208 one or more of the mid-level event logs to an action recognition system. An action recognition system may perform action recognition 210 on the mid-level event logs using image analysis and analysis of select known details of the mid-level event logs. FIG. 7 illustrates an example visual depiction of the action recognition process. FIG. 8 illustrates an example method of performing action recognition according to an embodiment.

As illustrated by FIG. 8, for one or more events in the mid-level event logs, the action recognition system may identify 800 a pair of images corresponding to the event. The pair of images includes a before-event image and an after-event image. The before-event image may be the nearest available image capture prior to the start of the event. Similarly, the after-event image may be the nearest available image capture after the end of the event.

The action recognition system analyzes the pair of images to classify 802 the event. Classifying an event may involve assigning the event a specific action identifier and a specific widget identifier. An action identifier refers to an indication of an action that a user performed to a window or windows as part of the event. Example action identifiers may include, without limitation, select, click, change, data entry, scroll, start/switch, move/resize, keyboard, mouse and/or the like. A widget identifier refers to an indication of widget type associated with the event and the action. For instance, "Select" is an example of an action identifier, and "Drop-down" is an example of a widget identifier. This notation indicates that a user selected a dropdown widget from a window. Event classifications are referred to throughout this disclosure in the format "<Action identifier>-<Widget identifier>" or {<Action identifier>, <Widget identifier>}.

Figure 17:
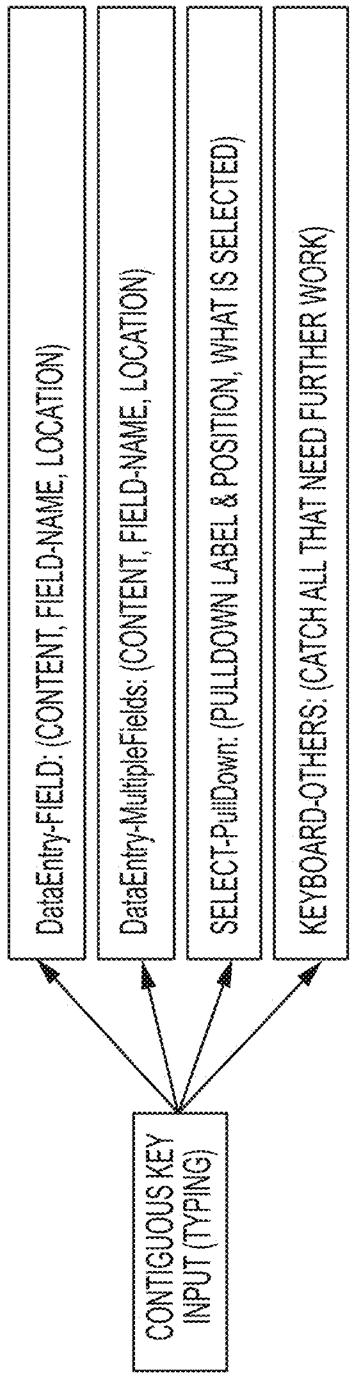
FIG. 17 illustrates example classifications for a contiguous key input event according to an embodiment.
Figure 18:
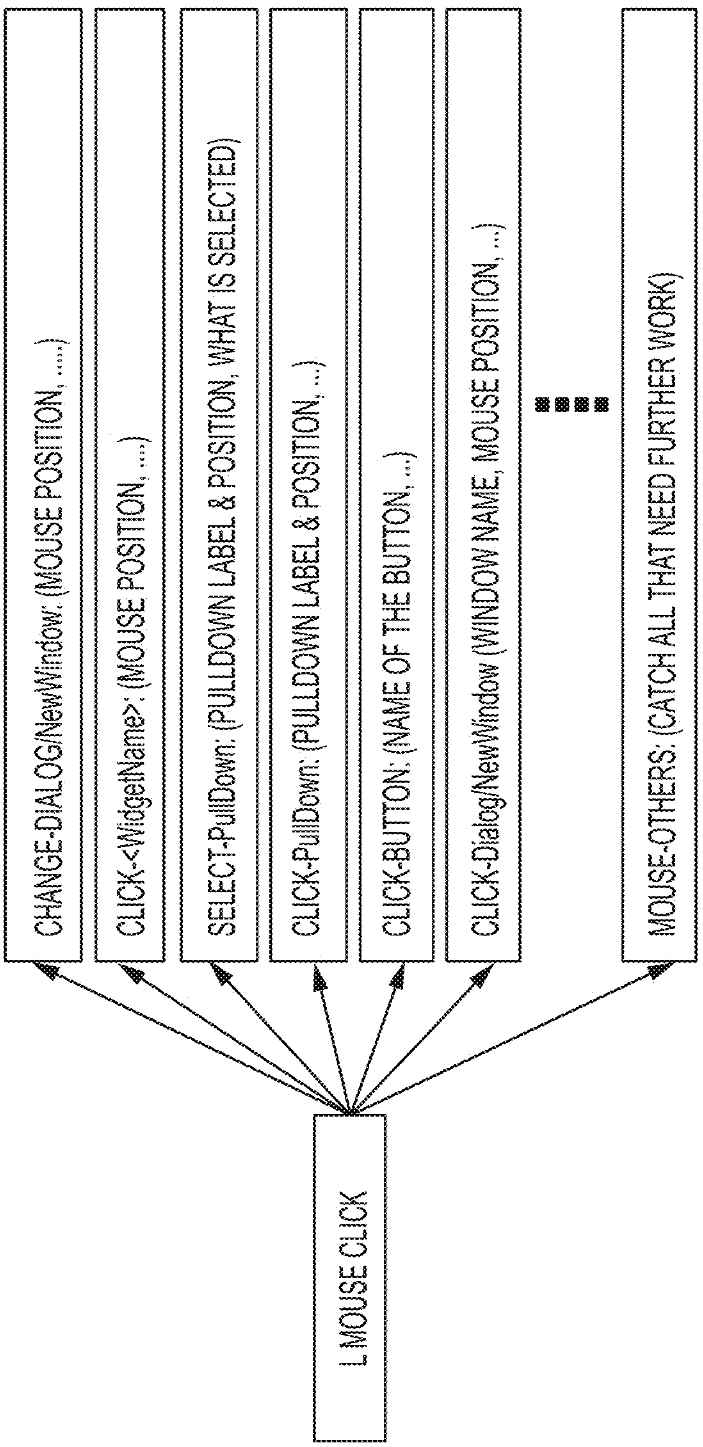
FIG. 18 illustrates example classifications for a left mouse click event according to an embodiment.
Figure 19:
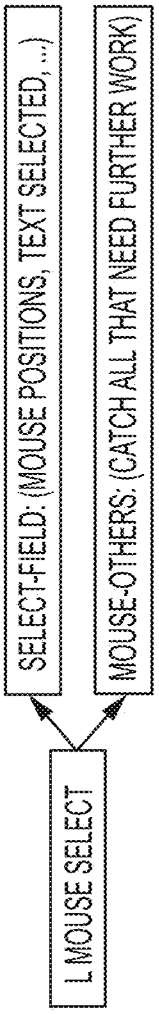
FIG. 19 illustrates example classifications for a left mouse select event according to an embodiment.

FIG. 17 illustrates example classifications for a contiguous key input event according to an embodiment. FIG. 18 illustrates example classifications for a left mouse click event according to an embodiment. FIG. 19 illustrates example classifications for a left mouse select event. Additional and/or alternate events, classifications or combinations of events and classifications may be used within the scope of this disclosure.

To analyze the pair of images, the action recognition system may use various techniques and combinations of techniques such as, for example, optical character recognition (OCR), form recognition, widget identification and/or the like. These techniques may be used in combination with other event log information and heuristic rules to facilitate action recognition and classify 802 an event.

For example, if the event is a keyboard event, the action recognition system determines a delta image associated with the before-event image and the after-event image. A keyboard event refers to an event associated with input data that was received by a keyboard of a user electronic device. The action recognition system analyzes the delta image to identify regions of change due to the keyboard event. For instance, an action recognition system may compare a before-event image to an after-event image to determine one or more changed regions of the image. A changed region refers to a region of the after-event image that is different than the same region in the before-event image. A change may be due to a user, such as an agent, entering text into a data field, selecting an option from a drop down menu, and/or the like.

In various embodiments, the system may use form recognition to analyze images. For instance, each time that the system encounters an image of a window, it may determine whether the window corresponds to a form that has been encountered before by the system. The system may make this determination by referencing a unique screen library (USL) maintained by the system. A USL contains information relevant to unique windows, screens or applications that are accessible by a user of a user electronic device such as, for example, how many unique windows exist and their layouts, the image appearance of the windows and/or the like. A USL may also contain metadata associated with one or more screens such as, for example, coordinates of widgets located on the screen or other layout information.

Figure 9:
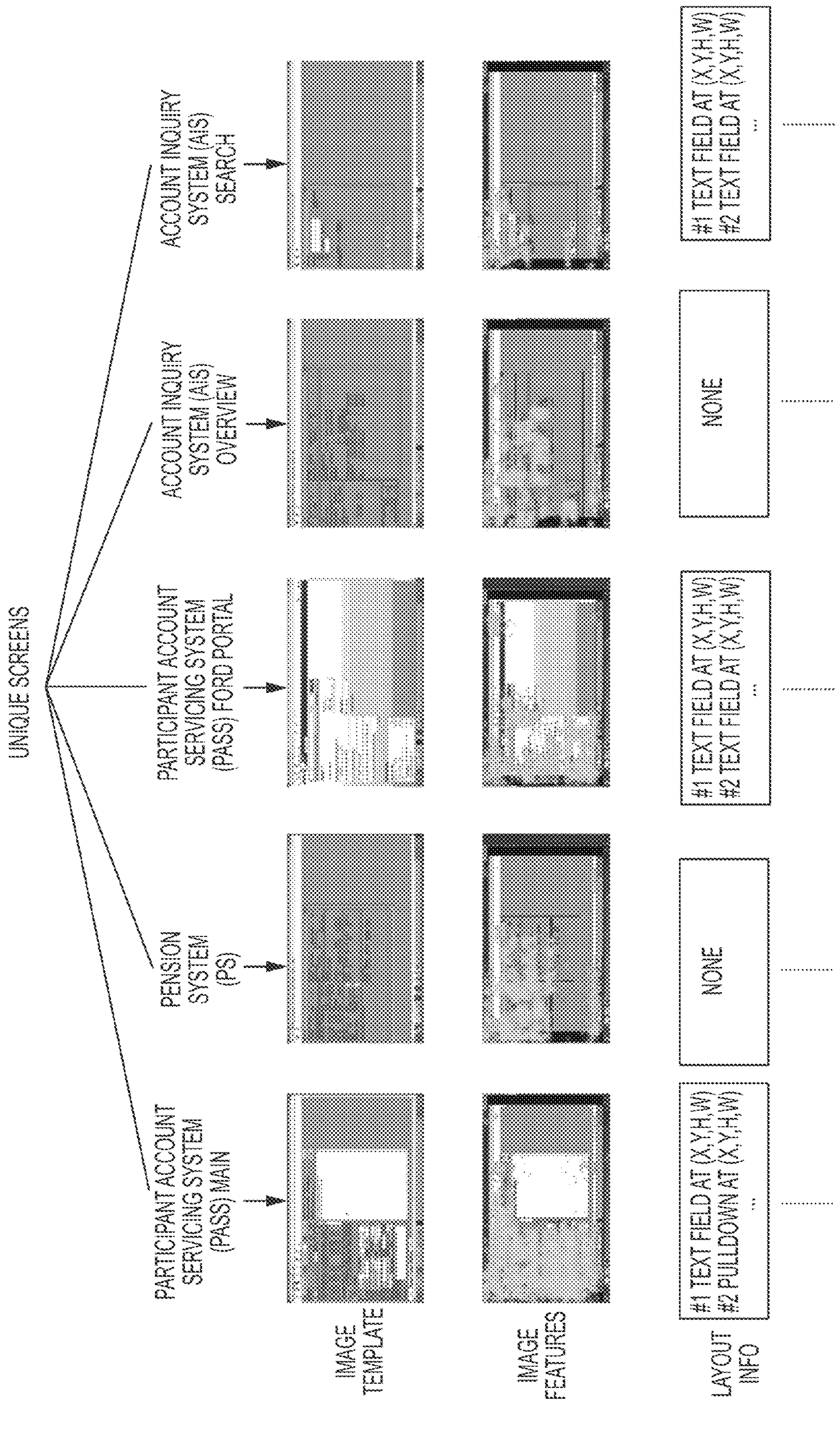
FIG. 9 shows an example of a USL of a call-type in a call center operation according to an embodiment.

FIG. 9 shows an example of a USL of a call-type in a call center operation. As illustrated by FIG. 9, the USL has a hierarchical structure. The top layer contains the list of unique screens represented by their names. For each unique screen, various metadata can be collected and stored. For example, it may contain a sample image for template matching, a set of image features such as location and description of speeded up robust feature points, a set of layout information indicating types, positions, and sizes of known widgets (e.g., text field, pull-down menu, radio button, check box, etc.) in the given unique screen. Additional information about each unique screen can also be stored elsewhere for later retrieval. Once a screen is recognized, its layout information is analyzed for action recognition. For instance, the metadata associated with a screen may be used to identify one or more widgets present within a region of interest.

Figure 10:
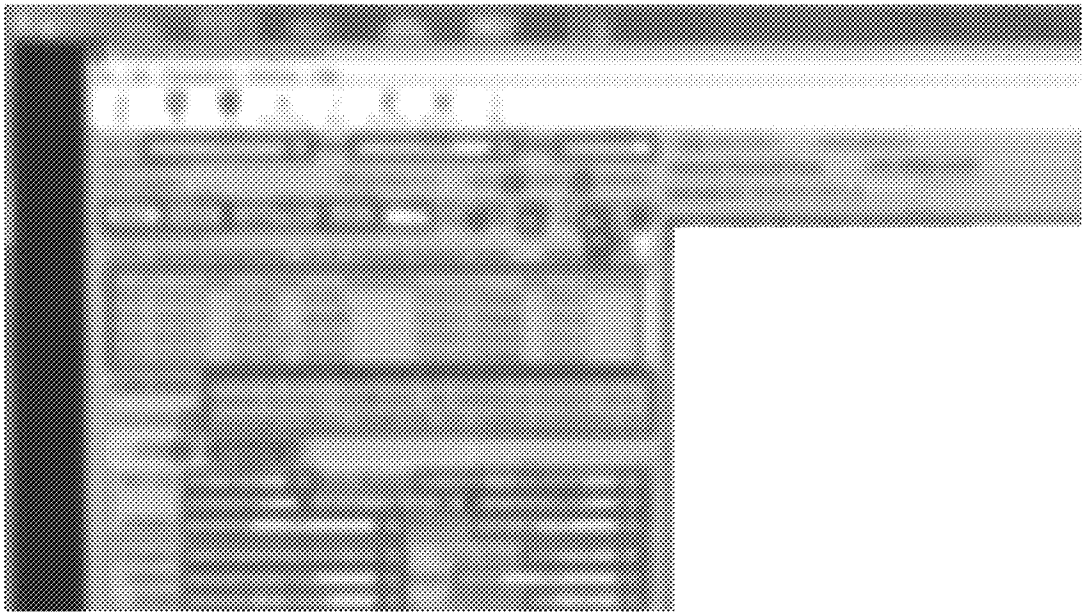
FIG. 10 shows an example of a labeled unique screen of a unique screen library according to an embodiment.

FIG. 10 shows an example of a labeled unique screen of the USL illustrated in FIG. 9, and an example of meta-data about the layout stored in the USL. A USL may include one or more rules followed by the unique screen. An example rule may be that a pull-down menu will appear whenever a mouse click happens within a box region.

The action recognition system may utilize a USL to identify more information about the changed regions. For example, a USL may provide insight into what data fields are present within a changed region, and this information may help the action recognition system classify the event. For example, if the action recognition system determines that a changed region includes data-entry fields, the action recognition system may classify the event as a "DataEntry" action. Depending on how many data-entry fields of changes are detected in the delta image, the action recognition system may assign the event a widget identifier of "Field" or "Multiple Fields." FIG. 7 illustrates example classifications of events according to various embodiments.

Figure 11:
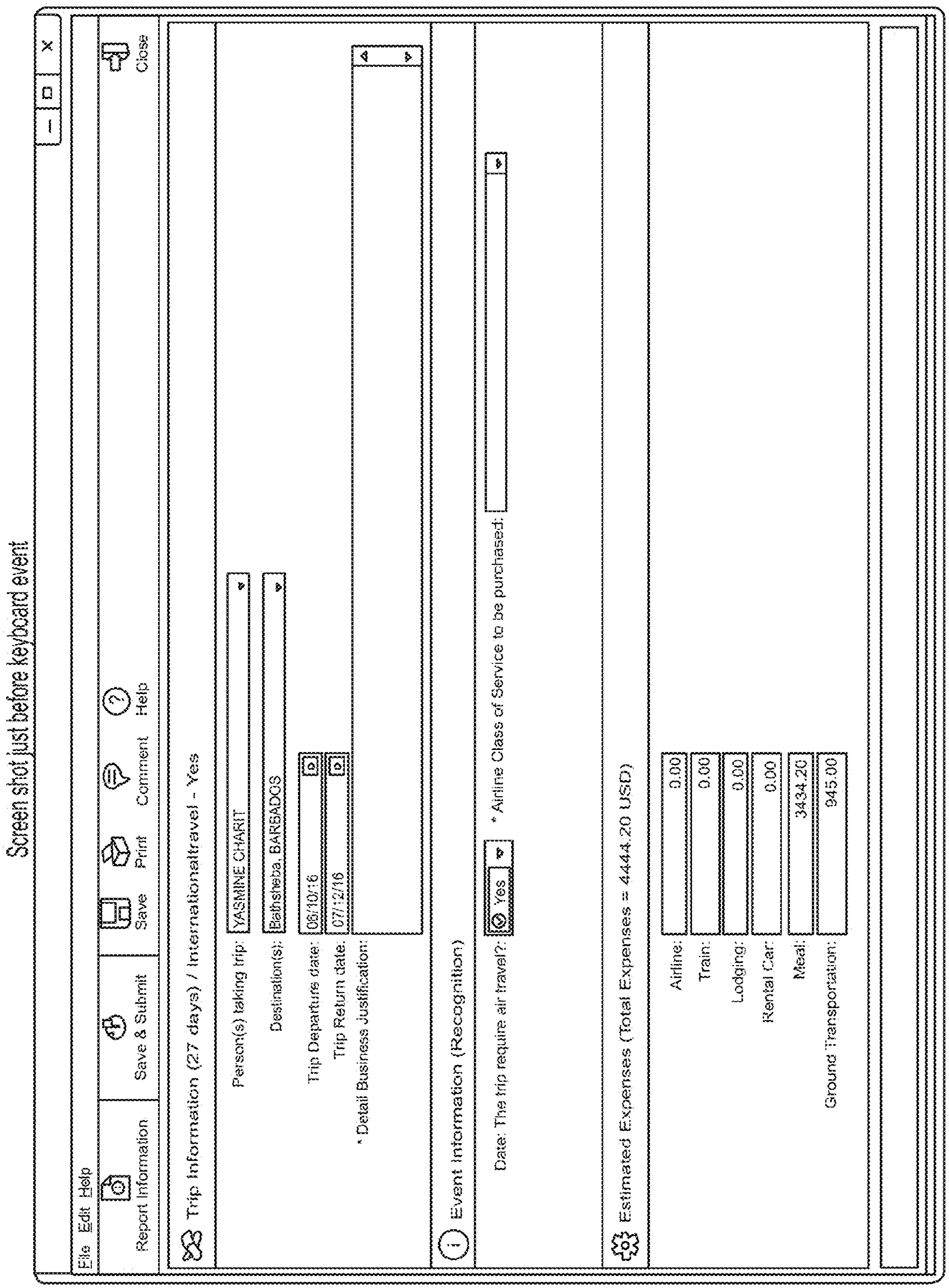
FIG. 11 illustrates an example before-event image according to an embodiment.
Figure 12:
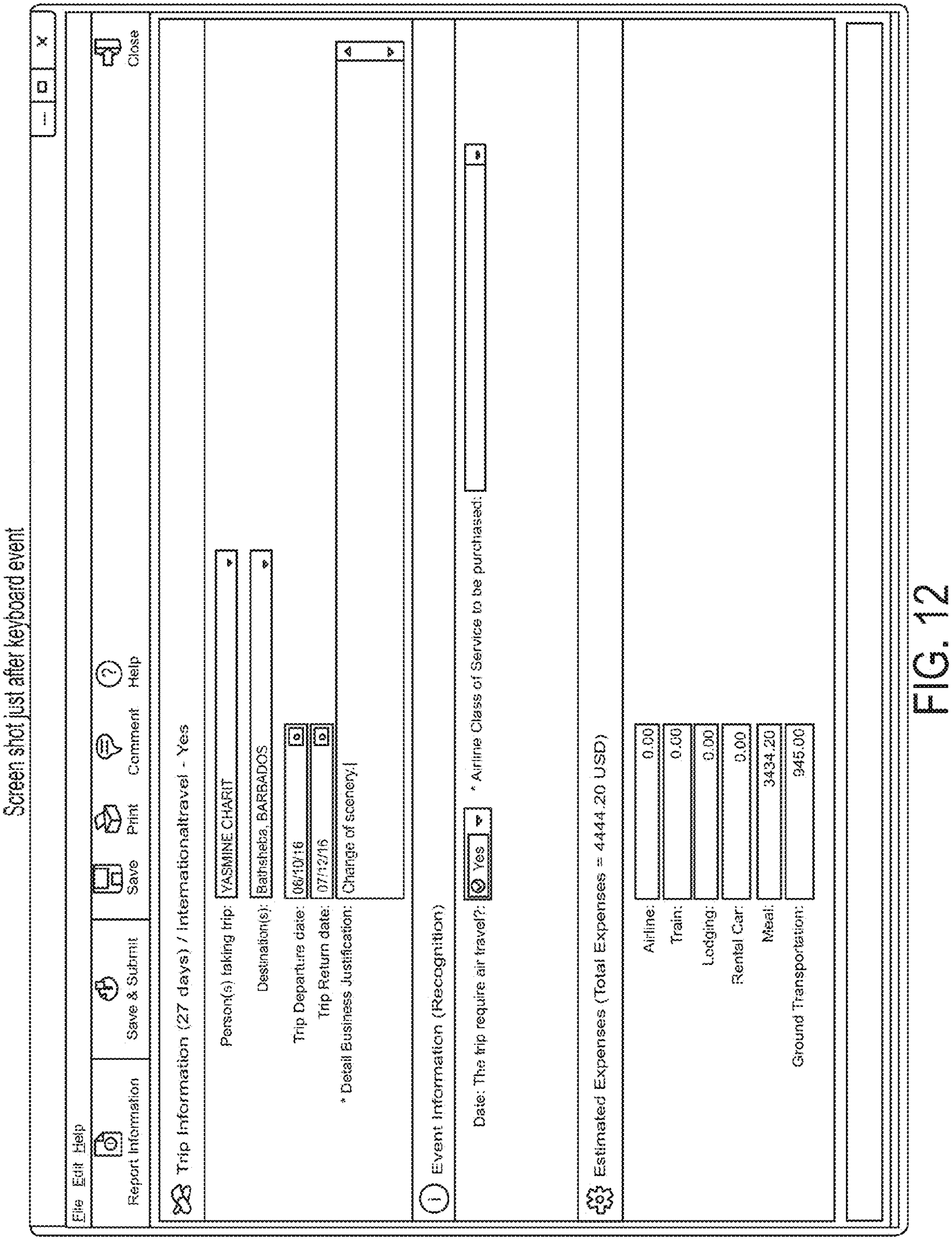
FIG. 12 illustrates an example after-event image according to an embodiment.
Figure 13:
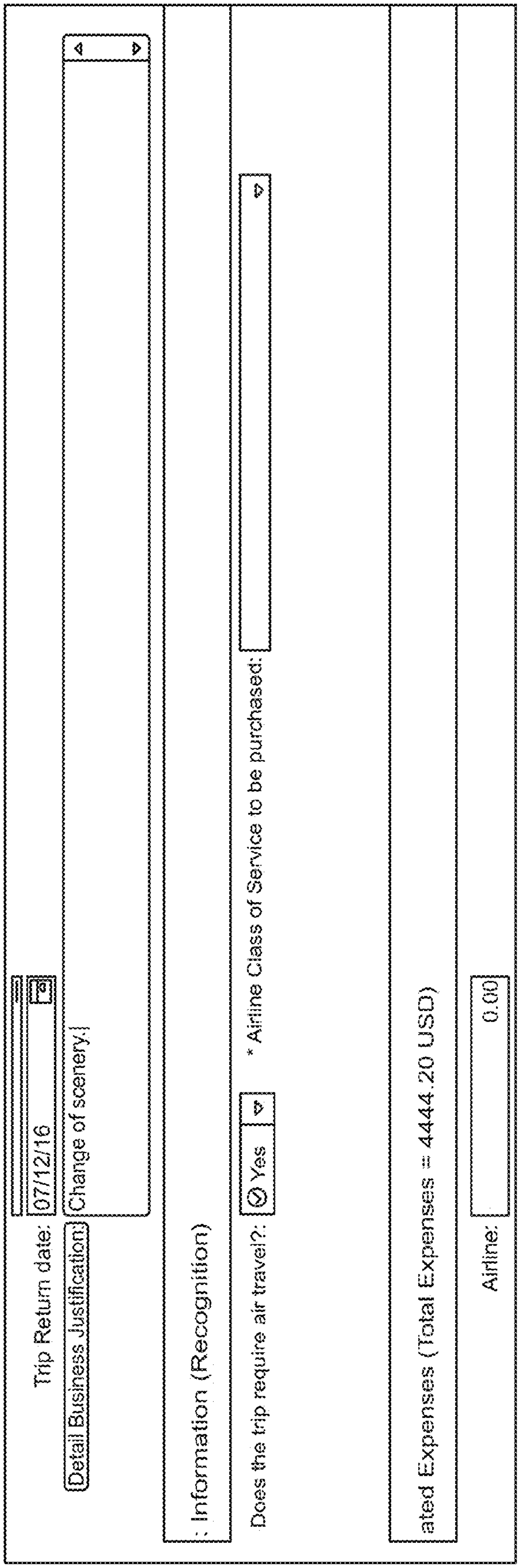
FIG. 13 illustrates an example changed region according to an embodiment.

As an example, FIG. 11 illustrates an example before-event image, while FIG. 12 illustrates an example after-event image. An action recognition system may identify the changed region, which is illustrated in FIG. 13. By referencing a USL, the action recognition system determines that this changed region is a data entry field entitled "Detailed Business Justification." The action recognition system classifies this event as a DataEntry action and a Field widget (classification={DataEntry, Field}).

Figure 14:
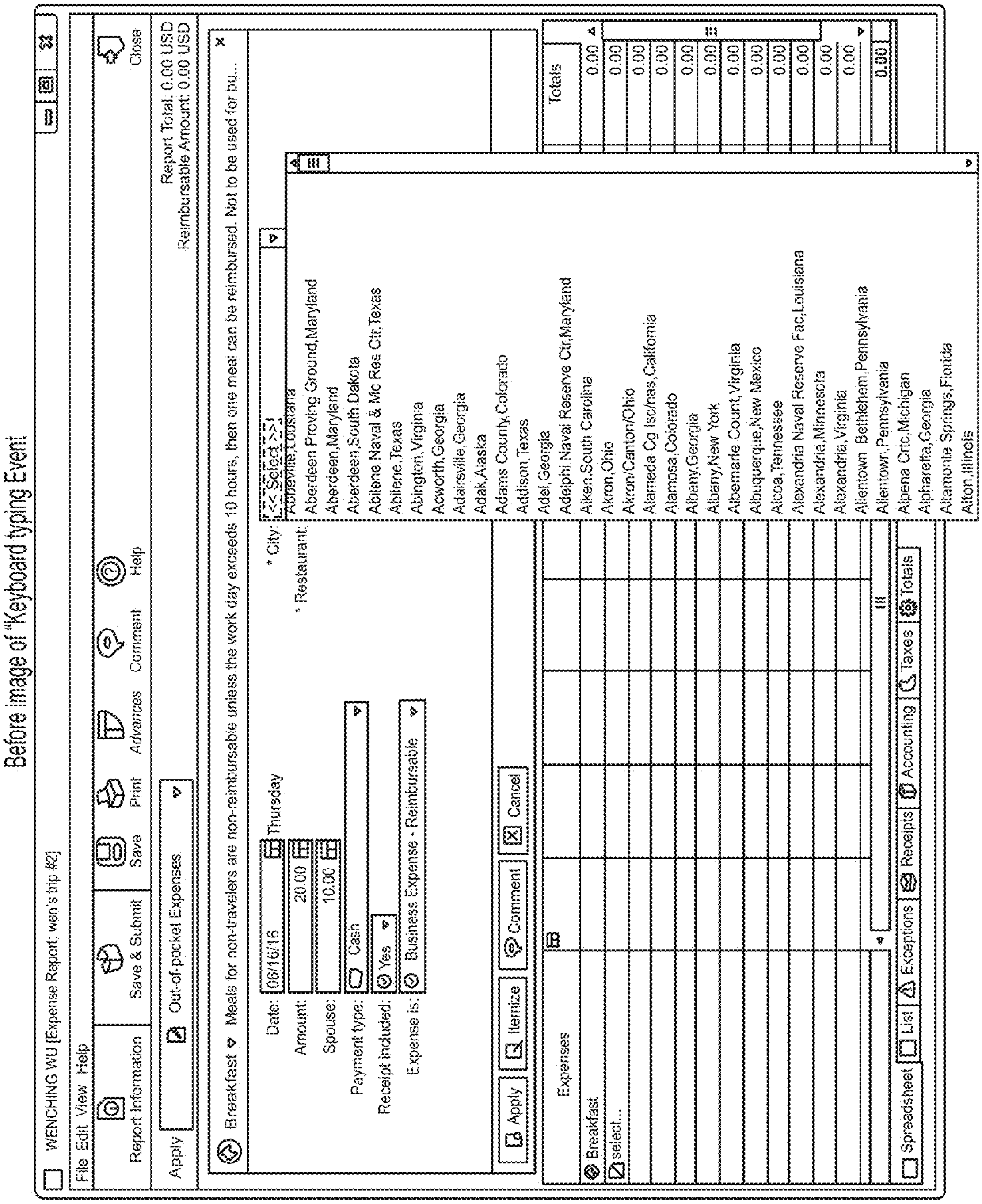
FIG. 14 illustrates an example screen before-event image according to an embodiment.
Figure 15:
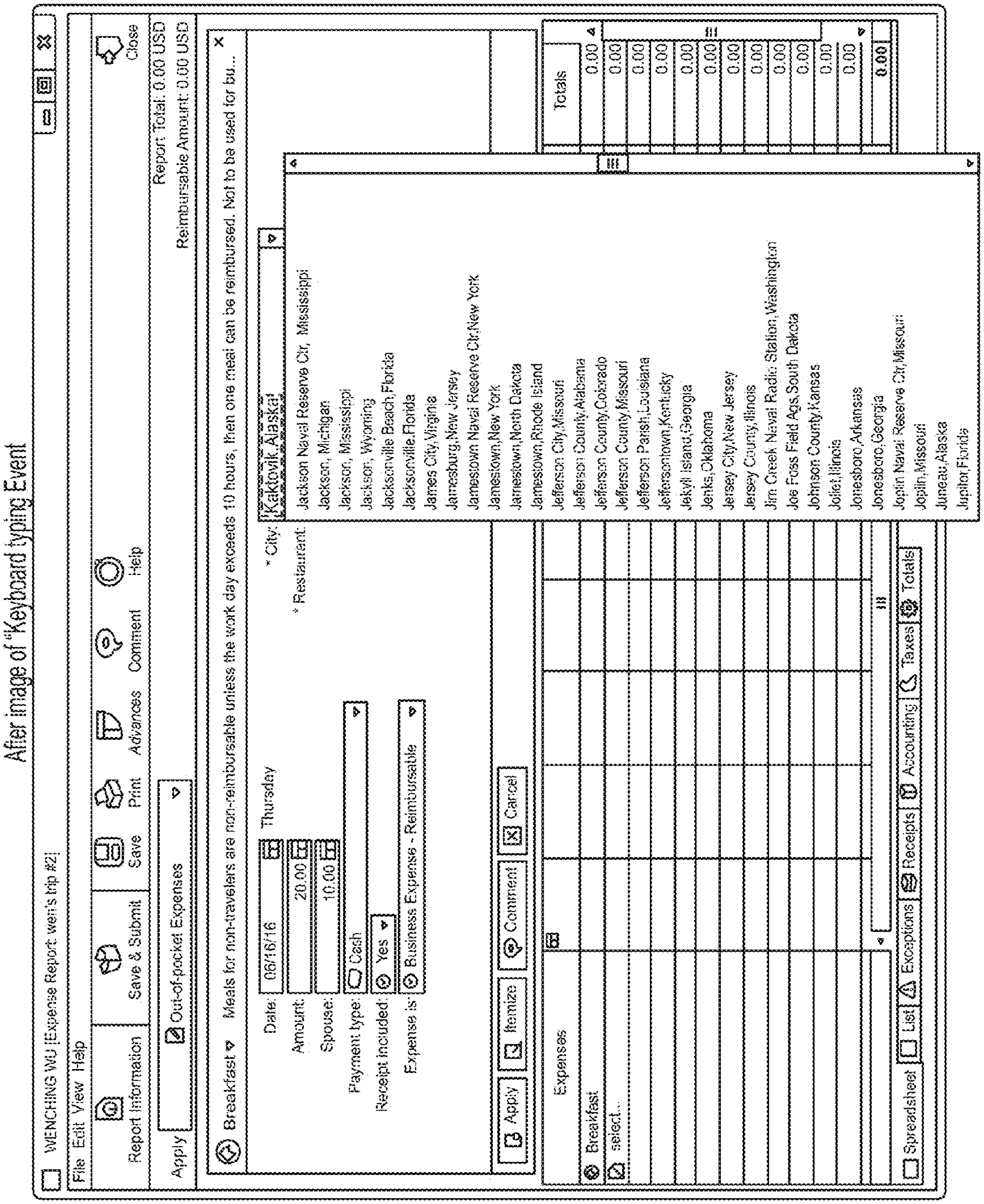
FIG. 15 illustrates an example after-event image according to an embodiment.

As another example, FIG. 14 illustrates an example screen before-event image, while FIG. 15 illustrates an example after-event image. An action recognition system may identify the changed region, which is illustrated in FIG. 16. By referencing a USL, the action recognition system determines that this changed region is a pull down menu. The action recognition system classifies this event as a Select action and a PullDown widget (classification={Select, PullDown}). In various embodiments, the action recognition system may determine the selected item in the pull down menu by performing OCR on the screen shot for after the event.

An action recognition system may process mouse events depending on the particular type of mouse event that is at issue. A mouse event refers to an event associated with input data that was received by a mouse of a user electronic device.

For example, for a "mouse scroll" mouse event, an action recognition system may identify a before-event image and an after-event image, and compute a delta image from the images. From the delta image, the action recognition system may determine a changed region as described above. If the changed region exceeds a threshold value, the action recognition system classifies the mouse event as "Scroll—Pop-up/New Window." The threshold value may represent the number of pixels that have changed between the before-event image and after-event image and is greater than a numeric threshold (e.g., a nonzero positive numeric threshold may be chosen to minimize false positives due to image noise).

If the changed region does not exceed a threshold value, the action recognition system removes the mid-level event log for the mouse event as it is unlikely that any significant change occurred.

As another example, for a "left mouse double click" mouse event, the action recognition system compares a mouse position where the double click occurred to the coordinates of an active window in a before-event image. If the mouse position is not within the active window, the action recognition system classifies the mouse event as "Change—Screen." If the mouse position is within the active window, the action recognition system uses the mouse position and image analysis of the before-event image and the delta image to classify the mouse event into one of the following classifications: "Select—Field" (if highlighted text is detected around the mouse click position in the before-image); "Resize—Pop-up/New Window" (if the active window size changed and the mouse click is on a top portion of the active window); and "Mouse—Others" (for any other conditions).

For a "left mouse click" mouse event, an action recognition system compares a mouse position where the click occurred to the coordinates of an active window in a before-event image. If the mouse position is outside of the active window, the action recognition system classifies the event as "Change—Pop-up/New Window." If the mouse position is within the active window, the action recognition system uses the mouse position and image analysis of the before-event image and the delta image to classify the mouse event.

For example, an action recognition system may identify a region around the area of the mouse click. If the region includes a widget, the action recognition system classifies the mouse event as "Click—<widget name>." If the region does not include a widget, then the action recognition system analyzes the delta image to identify one or more regions of change due to the mouse event. If the regions of change include a pulldown menu, the action recognition system determines whether the pulldown menu is present in the before-event image but not in the after-event image. If so, the action recognition system classifies the mouse event as "Select—PullDown." The action recognition system may use OCR on the region to determine which item from the pulldown menu is selected.

If the action recognition system determines that the pulldown menu is present in the after-event image but not in the before-event image, the action recognition system classifies the mouse event as "Click—Pulldown." The action recognition module may record the label or title of the pulldown (which may be obtained from form recognition) along with the classification to identify which pulldown menu was activated.

If the action recognition system determines that the pulldown menu is present in both the before-event image and the after-event image, the action recognition system classifies the mouse event as "Mouse—Others." This classification may indicate events that are not known, recognized or not encountered frequently.

The action recognition system may perform OCR on the region of the before-event image near the mouse click position. If no text is found, the action recognition system classifies the event as "Mouse—Others." If text is found, then it is likely that the region includes a clickable or selectable button. If the active window names are the same in the before-event image and the after-event image, the action recognition system classifies the event as "Click—Button." If the active window names are different in the before-event image and the after-event image, the action recognition system classifies the mouse event as "Click—DialogBox." The action recognition system may also record the name or title of the button or dialog box to identify which button or dialog box has been selected.

Figure 20:
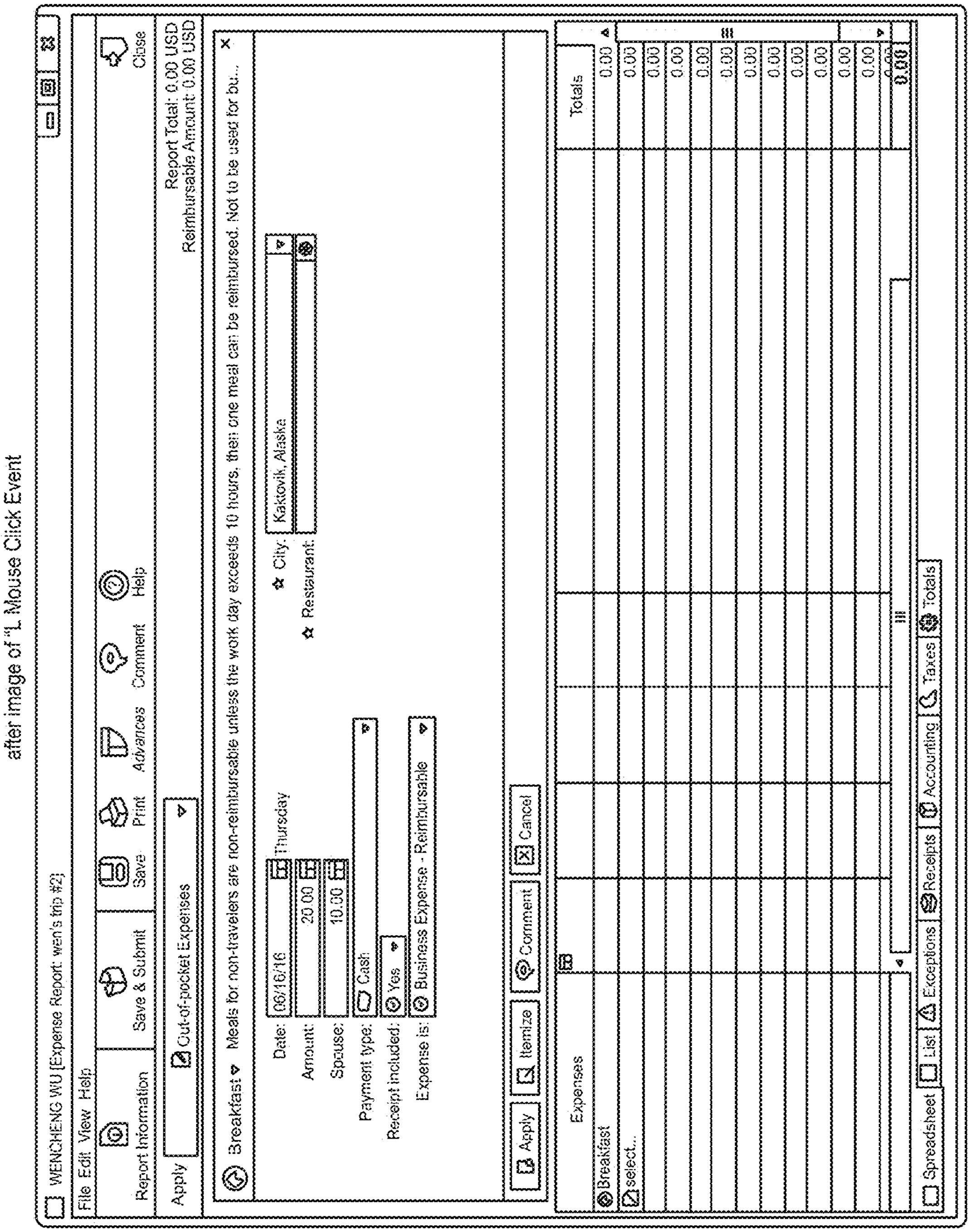
FIG. 20 illustrates an example before-event image for a left mouse click event according to an embodiment.
Figure 21:
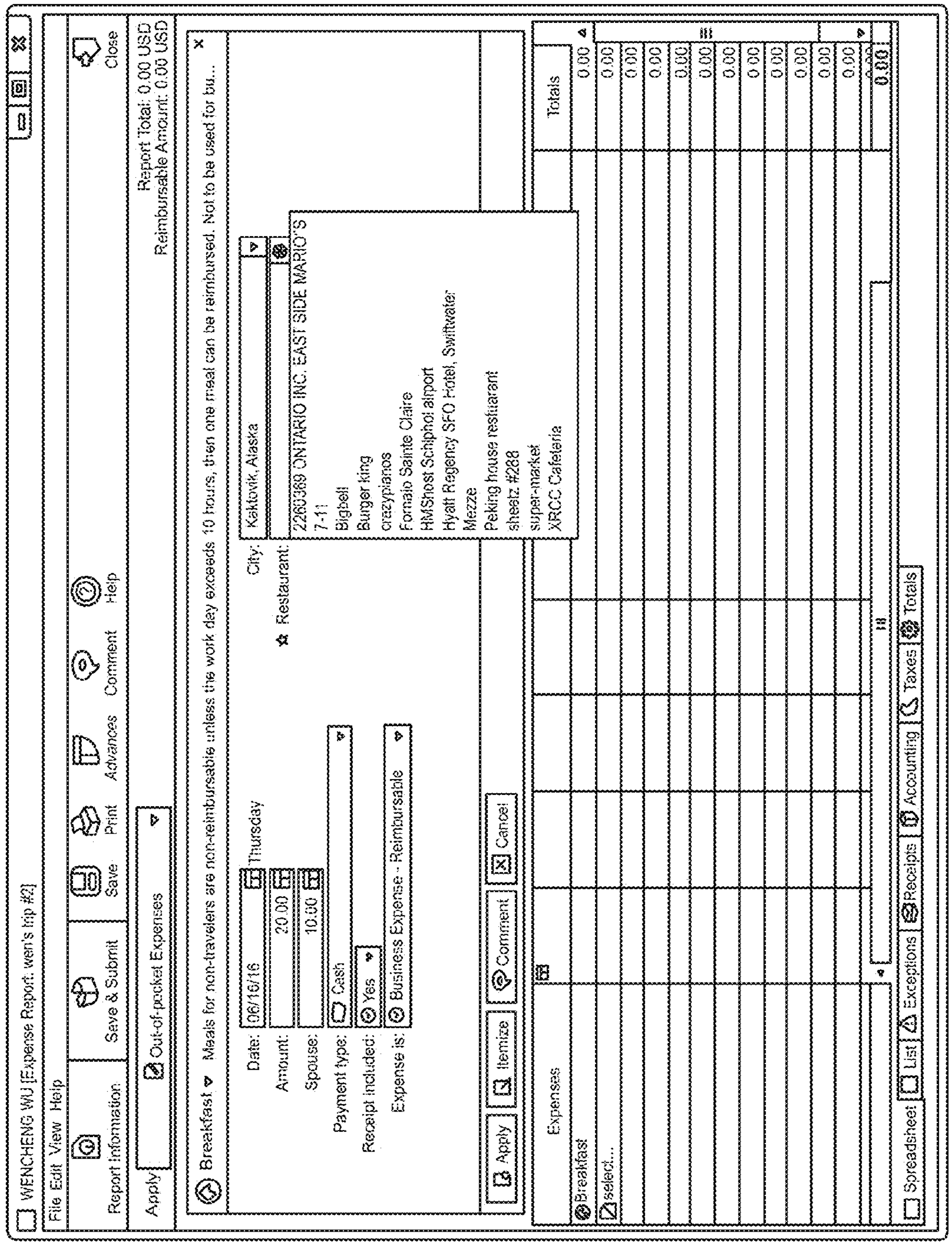
FIG. 21 illustrates an example after-event image for the left mouse click event according to an embodiment.
Figures 22A, 22B:
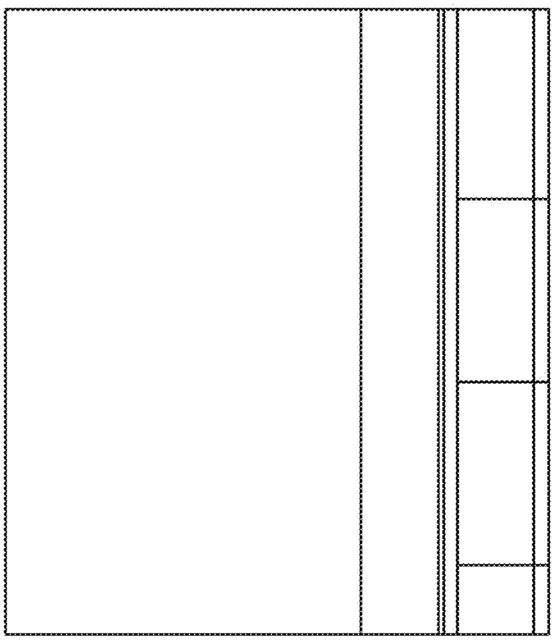
FIGS. 22A and 22B illustrate example crop regions according to an embodiment.

FIG. 20 illustrates an example before-event image for a left mouse click event according to an embodiment. FIG. 21 illustrates an example after-event image for the left mouse click event according to an embodiment. FIGS. 22A and 22B illustrate crop regions of the before-event image and the after-event image, respectively, that are identified from the delta image for the event. As illustrated by FIGS. 22A and 22B, the before-event image does not include a list-item, while the after-event image includes a list-item image. As such, the action recognition system classifies the event as a "Click—Pulldown" event.

For a "left mouse select" mouse event, the action recognition system uses a start mouse position and an end mouse position to crop out a segment of the before-event image. The action recognition system performs image analysis to confirm whether the selected region includes highlighted text. If it does not, the action recognition system classifies the event as "Mouse—Others." If it does, the action recognition system classifies the event as "Select—Field." The action recognition system may extract the detail information of what text has been selected via OCR and recorded as detailed information of the event.

For a "right mouse double click" mouse event, the action recognition system will treat this event as a "right mouse click" event.

A "right mouse click" event nay be unusual, but if encountered, it is likely that a pop-up selection menu will be present in the after-event image. To confirm, the action recognition system analyzes the delta image to find the regions of change and confirm the presence of a list-item. If confirmed, the action recognition system classifies the event as "Click—Pop-up/New Window"—meaning that a click action that causes a pop-up window to appear. If not confirmed, the event is classified as "Mouse—Others."

A "right mouse select" is rarely occurred and is likely due to an extra click. As such, the action recognition system treats the event as a "right mouse click" and analyzes it the same way.

Referring back to FIG. 2, an integration system may resolve 212 one or more events having a widget identifier "Others." An integration system may resolve 212 an event having a widget identifier "Others" using one or more heuristic rules. For example, an event classified as "Click—Pulldown" is expected to be followed by an event that is classified as "Select—Pulldown." As such, if there is an event classified as "Mouse—Others" or "Keyboard—Others" that immediately follows an event classified as "Click—Pulldown" and no event classified as "Select—Pulldown" follows it within a time period, then the integration system will update the classification "Mouse—Others" to "Select—Pulldown."

As another example, a left mouse select or left mouse double click event that is classified as "Select—Field" is likely to be followed by a copy and paste action, such as CTRL-C and CTRL-V. If the integration system identifies a copy and paste event from a log that is not preceded by an event labeled "Select—Field" in the log (e.g., during a certain time period), the integration system may change the nearest event classified as "Mouse—Others" that occurred prior to the copy and paste to a classification of "Select—Field."

Referring back to FIG. 2, a process mining system may use the mid-level event logs generated by the information extraction system and/or the classifications generated by the action recognition system to generate 214 one or more event logs. FIG. 25 illustrates an example event log according to an embodiment. The event logs may capture events at different levels of granularity. For example, an event log may capture events where the activities are the application names at a high level. Alternatively, an event log may capture actions at a much finer widget action level. An event log may include an indication of one or more steps of a process. The indication may be in the form of a process flow or a process map.

The process mining system may include one or more subsystems. Example subsystems may include, without limitation, a process map discovery subsystem, a process performance subsystem, and a conformance subsystem.

The process map discovery subsystem may apply one or more process discovery techniques to one or more event logs to identify one or more processes. Example process discovery techniques include, without limitation, Petri nets, EPC process modeling, BPMN process modeling, heuristicnets and/or the like.

A process map discovery subsystem discovers the control-flow of processes from the event logs. The process map discovery subsystem may generate corresponding process maps based on the control-flow. The process map discovery subsystem may identify hierarchical process maps with seamless zoom-in/out facility. Event logs may be captured at different levels of granularity. For coarser granular events, the system can capture detailed sub-events performed underneath the event itself such as, for example, actions that are performed within an application. These sub-events may be used to capture the sub-process running underneath the coarse activity. Upon zooming on the coarse activity, the system may discover the subprocess as well. As such a process map may be enriched with additional insightful information. For example, edges and nodes may be annotated with frequency information. The thickness of an edge may be used to depict a relative frequency of traversal. A process map may quickly highlight the highways or paths of the process.

A process performance subsystem may analyze different perspectives of process performance from one or more event logs. For example, a process performance subsystem may analyze flow-times between successive states of the process, the average flow-time and flow-time distributions between successive flows, and/or the like. The process map may be annotated based on this analysis. For example, bottleneck-prone flows may be highlighted in red, and upon clicking any flow, the flow-time distribution along with other performance statistics may be displayed.

A process performance subsystem may analyze flow-times between any two states of the process. For instance, the average flow-time along with flow-time distributions between any two states or transitions of a process may be computed and displayed. If a process model has "N" activities, the process performance subsystem may depict an N×N triangular matrix, where each cell (I,J) depicts the average flow-time between activities I and J. Further with rich interaction, the subsystem may show distribution of flow-times and other statistics between any pair of activities upon clicking on any cell.

A process performance subsystem may analyze the average execution time of one or more tasks/activities in the process and compute and display the corresponding execution time distributions.

A process performance subsystem may analyze the behavior of resources on various tasks. For example, the subsystem may generate resource x task M×N matrices where there are "M" resources and "N" tasks who worked on the process. Different matrices capturing different aspects of resource behavior on the tasks are captured, e.g., one matrix captures the frequency of execution, another captures the average execution time of a resource on a particular task, etc. Upon clicking a cell in the matrix, further details can be shown e.g., the execution time distribution of resource on a particular task etc.

A process performance subsystem may check for compliance of process execution with respect to expected behavior. Expected behavior may be specified in the form of process models, business rules and/or the like. The subsystem may analyze the actual behavior as compared to the expected behavior and capture the deviations or anomalies, which it may present to a user, such as a business analyst.

In various embodiments, a process mining system may offer one or more recommendations or suggestions for process improvement. For instance, a process mining system may identify one or more process bottlenecks which may be redundant to the process. The process mining system may recommend that these bottlenecks be removed. The process mining system may present one or more recommendations to a user such as, for example, an administrator.

Figure 24:
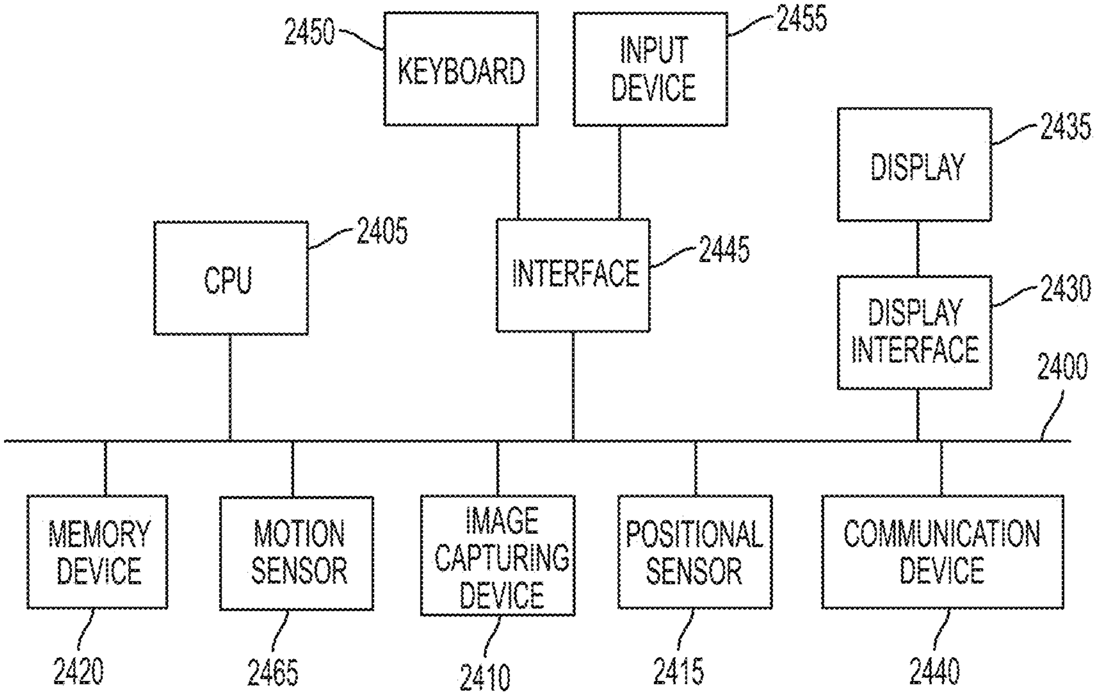
FIG. 24 illustrates a block diagram of example hardware that may be used to contain or implement program instructions according to an embodiment.

FIG. 24 depicts a block diagram of hardware that may be used to contain or implement program instructions, such as those of a cloud-based server, electronic device, virtual machine, or container. A bus 2400 serves as an information highway interconnecting the other illustrated components of the hardware. The bus may be a physical connection between elements of the system, or a wired or wireless communication system via which various elements of the system share data. Processor 2405 is a processing device that performs calculations and logic operations required to execute a program. Processor 2405, alone or in conjunction with one or more of the other elements disclosed in FIG. 24, is an example of a processing device, computing device or processor as such terms are used within this disclosure. The processing device may be a physical processing device, a virtual device contained within another processing device, or a container included within a processing device.

A memory device 2410 is a hardware element or segment of a hardware element on which programming instructions, data, or both may be stored. Read only memory (ROM) and random access memory (RAM) constitute examples of memory devices, along with cloud storage services.

An optional display interface 2430 may permit information to be displayed on the display 2435 in audio, visual, graphic or alphanumeric format. Communication with external devices, such as a printing device, may occur using various communication devices 2440, such as a communication port or antenna. A communication device 2440 may be communicatively connected to a communication network, such as the Internet or an intranet.

The hardware may also include a user input interface 2445 which allows for receipt of data from input devices such as a keyboard or keypad 2450, or other input device 2455 such as a mouse, a touch pad, a touch screen, a remote control, a pointing device, a video input device and/or a microphone. Data also may be received from an image capturing device 2420 such as a digital camera or video camera. A positional sensor 2415 and/or motion sensor 2465 may be included to detect position and movement of the device. Examples of motion sensors 2465 include gyroscopes or accelerometers. An example of a positional sensor 2415 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for recognizing processes performed by a call center agent during a session, the method comprising:

collecting, by an electronic device from one or more input devices in communication with the electronic device, input data comprising data pertaining to one or more interactions that a call center agent has with one or more programs running on the electronic device that cause one or more graphical user interfaces to be displayed on a desktop of the electronic device during a session;

analyzing, by the electronic device, the input data to generate one or more events, wherein each event comprises a consolidation of at least a portion of the input data;

generating, by the electronic device, a mid-level event log comprising one or more of the events;

performing, by the electronic device, action recognition on the mid-level event log to ascertain one or more actions that were performed within the one or more graphical user interfaces by the call center agent during the session, by:

for one or more events in the mid-level event log:

identifying a before-event image for the event, wherein the before-event image is a screen shot of the desktop that was automatically captured by the electronic device in real-time before the event occurred and in anticipation of the event, identifying an after-event image for the event, wherein the after-event image is a screen shot of the desktop of the electronic device that was automatically captured by the electronic device in real-time after the event occurred, performing image analysis on the before-event image and the after-event to generate a delta image showing a region of interest that includes one or more changes between the before-event image and the after-event image, and automatically classifying the event as an action based on the delta image, and generate an event log that comprises an indication of the event and corresponding action.

2. The method of claim 1, wherein collecting input data comprises one or more of the following:

initiating a keyboard logging thread to collect one or more keystrokes that are entered via a keyboard in communication with the electronic device during the session;

initiating a mouse logging thread to collect data associated with movement or operation of the mouse during the session; or initiating an active window logging thread to collect data associated with active windows during the session.

3. The method of claim 1, wherein generating the mid-level event log based on the input data comprises:

identifying consecutive keyboard entries in the input data; and in response to determining that a time between each keyboard entry is less than a threshold value, merging the keyboard entries into a single typing event.

4. The method of claim 1, wherein generating the mid-level event log based on the input data comprises:

identifying from the input data representing a mousedown event corresponding to a mouse followed by data representing a mouseup event corresponding to the mouse such that there is no change in a position of the mouse; and consolidating the mousedown event and the mouse up event into a single event represented as a mouse click event.

5. The method of claim 1, wherein generating the mid-level event log based on the input data comprises:

identifying from the input data consecutive mouse clicks corresponding to a mouse; and consolidating the consecutive mouse clicks into a single event represented as a double click mouse click event.

6. The method of claim 1, wherein generating the mid-level event log based on the input data comprises:

identifying from the input data a mousedown event followed by a plurality of mouse movement events followed by a mouseup event; and consolidating the mousedown event, the mouse movement events and the mouseup event into a single event represented as a mouse select event.

7. The method of claim 1, wherein generating the mid-level event log based on the input data comprises:

identifying from the input data consecutive mouse wheel events; and consolidating the consecutive mouse wheel events into a single event represented as a mouse scroll event.

8. The method of claim 1, wherein performing image analysis on the before-event image and the after-event to generate a delta image comprises:

identifying a screen to which the before-event image and the after-event image correspond by comparing the before-event image and the after-event image to one or more screens in a unique screen library, wherein the unique screen library stores each unique screen that the call agent may encounter during a session along with metadata associated with each unique screen;

analyzing the screen to identify a region on the screen that corresponds to the region of interest; and analyzing the metadata associated with the screen to identify a data field located within the region.

9. The method of claim 8, wherein:

the event is a mouse click, analyzing the metadata associated with the screen to identify a data field located within the region comprises analyzing the metadata to identify a dropdown menu, classifying the event as an action comprises classifying the event as a select dropdown menu action.

10. The method of claim 1, further comprising applying a process discovery technique to the event log to generate a process map showing the actions performed by the call center agent during the session.

11. A system for recognizing processes performed by a call center agent during a session, the system comprising:

an electronic device; and a computer-readable storage medium in communication with the electronic device, wherein the computer-readable storage medium comprises one or more programming instructions that, when executed, cause the electronic device to:

collect from one or more input devices in communication with the electronic device, input data comprising data pertaining to one or more interactions that a call center agent has with one or more programs running on the electronic device that cause one or more graphical user interfaces to be displayed on a desktop of the electronic device during a session, analyze the input data to generate one or more events, wherein each event comprises a consolidation of at least a portion of the input data, generate a mid-level event log comprising one or more of the events, perform action recognition on the mid-level event log to ascertain one or more actions that were performed within the one or more graphical user interfaces by the call center agent during the session, by:

for one or more events in the mid-level event log:

identify a before-event image for the event, wherein the before-event image is a screen shot of the desktop that was automatically captured by the electronic device in real-time before the event occurred and in anticipation of the event, identify an after-event image for the event, wherein the after-event image is a screen shot of the desktop of the electronic device that was automatically captured by the electronic device in real-time after the event occurred, perform image analysis on the before-event image and the after-event to generate a delta image showing a region of interest that includes one or more changes between the before-event image and the after-event image, and automatically classify the event as an action based on the delta image, and generate an event log that comprises an indication of the event and corresponding action.

12. The system of claim 11, wherein the one or more programming instructions that, when executed, cause the electronic device to collect input data comprise one or more programming instructions that, when executed, cause the electronic device to perform one or more of the following:

initiate a keyboard logging thread to collect one or more keystrokes that are entered via a keyboard in communication with the electronic device during the session;

initiate a mouse logging thread to collect data associated with movement or operation of the mouse during the session; or initiate an active window logging thread to collect data associated with active windows during the session.

13. The system of claim 11, wherein the one or more programming instructions that, when executed, cause the electronic device to generate the mid-level event log based on the input data comprise one or more programming instructions that, when executed, cause the electronic device to:

identify consecutive keyboard entries in the input data; and in response to determining that a time between each keyboard entry is less than a threshold value, merge the keyboard entries into a single typing event.

14. The system of claim 11, wherein the one or more programming instructions that, when executed, cause the electronic device to generate the mid-level event log based on the input data comprise one or more programming instructions that, when executed, cause the electronic device to:

identify from the input data representing a mousedown event corresponding to a mouse followed by data representing a mouseup event corresponding to the mouse such that there is no change in a position of the mouse; and consolidate the mousedown event and the mouse up event into a single event represented as a mouse click event.

15. The system of claim 11, wherein the one or more programming instructions that, when executed, cause the electronic device to generate the mid-level event log based on the input data comprise one or more programming instructions that, when executed, cause the electronic device to:

identify from the input data consecutive mouse clicks corresponding to a mouse; and consolidate the consecutive mouse clicks into a single event represented as a double click mouse click event.

16. The system of claim 11, wherein the one or more programming instructions that, when executed, cause the electronic device to generate the mid-level event log based on the input data comprise one or more programming instructions that, when executed, cause the electronic device to:

identify from the input data a mousedown event followed by a plurality of mouse movement events followed by a mouseup event; and consolidate the mousedown event, the mouse movement events and the mouseup event into a single event represented as a mouse select event.

17. The system of claim 11, wherein the one or more programming instructions that, when executed, cause the electronic device to generate the mid-level event log based on the input data comprise one or more programming instructions that, when executed, cause the electronic device to:

identify from the input data consecutive mouse wheel events; and consolidate the consecutive mouse wheel events into a single event represented as a mouse scroll event.

18. The system of claim 11, wherein the one or more programming instructions that, when executed, cause the electronic device to perform image analysis on the before-event image and the after-event to generate a delta image comprise one or more programming instructions that, when executed, cause the electronic device to:

identify a screen to which the before-event image and the after-event image correspond by comparing the before-event image and the after-event image to one or more screens in a unique screen library, wherein the unique screen library stores each unique screen that the call agent may encounter during a session along with metadata associated with each unique screen;

analyze the screen to identify a region on the screen that corresponds to the region of interest; and analyze the metadata associated with the screen to identify a data field located within the region.

19. The system of claim 18, wherein:

the event is a mouse click, the one or more programming instructions that, when executed, cause the electronic device to analyze the metadata associated with the screen to identify a data field located within the region comprise one or more programming instructions that, when executed, cause the electronic device to analyze the metadata to identify a dropdown menu, the one or more programming instructions that, when executed, cause the electronic device to classify the event as an action comprise one or more programming instructions that, when executed, cause the electronic device to classify the event as a select dropdown menu action.

20. The system of claim 11, wherein the computer-readable storage medium further comprises one or more programming instructions that, when executed, cause the electronic device to apply a process discovery technique to the event log to generate a process map showing the actions performed by the call center agent during the session.

* * * * *